United States Patent
Linsky et al.

(10) Patent No.: US 11,558,155 B2
(45) Date of Patent: Jan. 17, 2023

(54) BROADCAST RELAY PICONET FOR LOW ENERGY AUDIO

(71) Applicant: QUALCOMM Incorporated, San Diego, CA (US)

(72) Inventors: Joel Linsky, San Diego, CA (US); Mayank Batra, Cambridge (GB); Robin Heydon, Cambridge (GB); Brian Redding, Urbana, IL (US)

(73) Assignee: QUALCOMM INCORPORATED, San Diego, CA (US)

( * ) Notice: Subject to any disclaimer, the term of this patent is extended or adjusted under 35 U.S.C. 154(b) by 282 days.

(21) Appl. No.: 16/814,857

(22) Filed: Mar. 10, 2020

(65) Prior Publication Data

US 2021/0288764 A1 Sep. 16, 2021

(51) Int. Cl.
*H04L 1/22* (2006.01)
*H04L 65/611* (2022.01)
*H04W 4/80* (2018.01)

(52) U.S. Cl.
CPC ............. *H04L 1/22* (2013.01); *H04L 65/611* (2022.05); *H04W 4/80* (2018.02)

(58) Field of Classification Search
CPC ............................ H04L 65/611; H04W 4/80
See application file for complete search history.

(56) References Cited

U.S. PATENT DOCUMENTS

| 2018/0084456 A1 | 3/2018 | Gostev et al. |
| 2020/0037398 A1 | 1/2020 | Adachi et al. |

FOREIGN PATENT DOCUMENTS

| CN | 110383767 A | * 10/2019 | ....... H04L 12/40019 |
| WO | 2020210500 A1 | 10/2020 | |

OTHER PUBLICATIONS

International Search Report and Written Opinion—PCT/US2021/021460—ISA/EPO—dated Jun. 16, 2021.

* cited by examiner

*Primary Examiner* — Samina F Choudhry
(74) *Attorney, Agent, or Firm* — Procopio, Cory, Hargreaves & Savitch LLP

(57) ABSTRACT

This disclosure describes a first slave device that transmits information to a second slave device indicating that a first data packet was improperly received from a master device, so that a corresponding data packet may be relayed from the second slave device to the first slave device. In an aspect, the second slave device may receive a first data packet followed by an indication that the first slave device improperly received the first data packet, where the second slave device is configured to relay the first data packet to the first slave device in response thereto. In another aspect, the second slave device may receive a request to listen for a separate data stream of the first slave device based on a first data packet being improperly received by the first slave device and transmit a second data packet of the separate data stream to the first slave device.

28 Claims, 17 Drawing Sheets

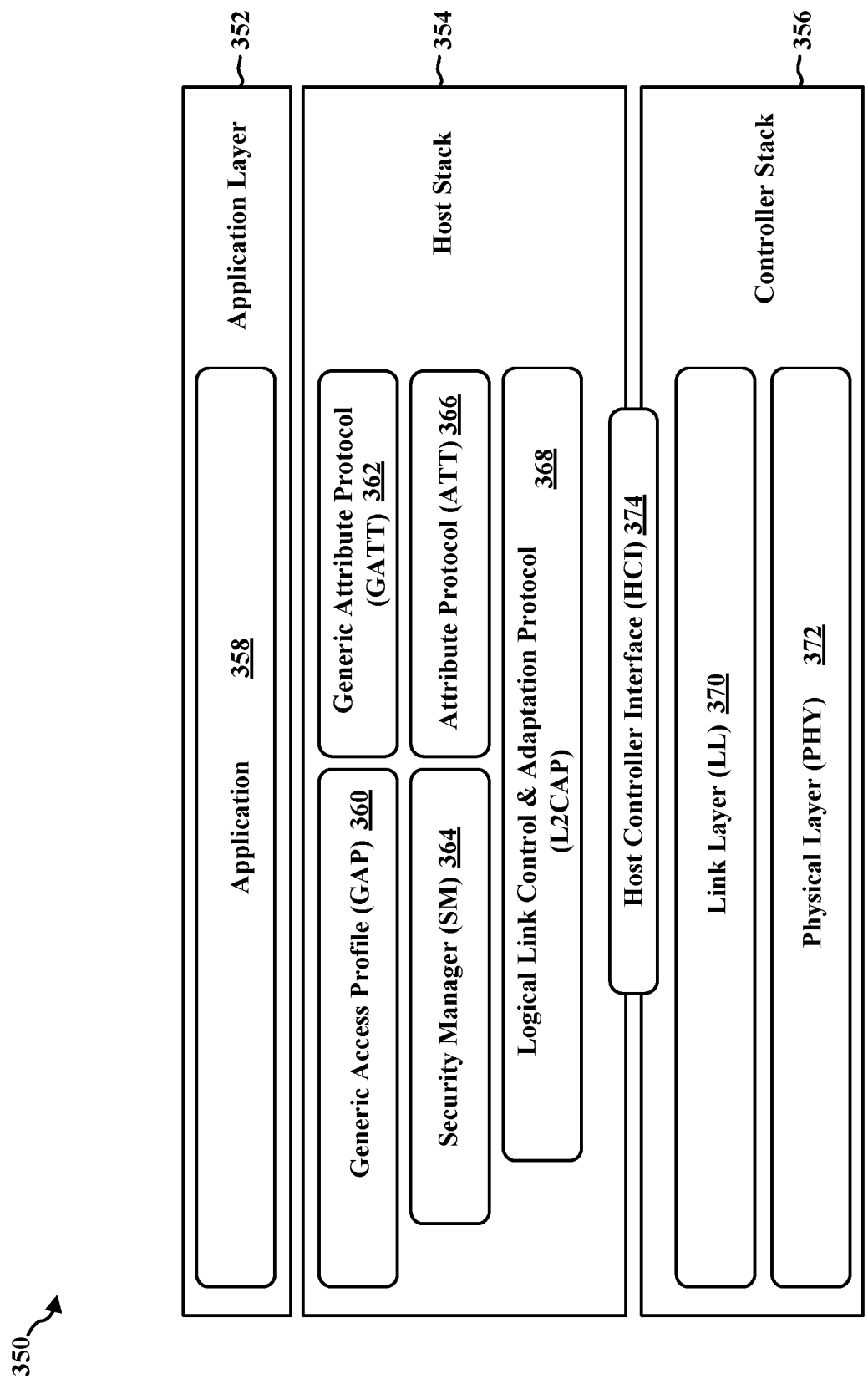

BROADCAST RELAY PICONET FOR LOW ENERGY AUDIO

BACKGROUND

Technical Field

The present disclosure relates generally to communication systems, and more particularly, to a broadcast relay piconet for low energy (LE) audio.

Introduction

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance, such as 5 meters, 10 meter, 20 meters, 100 meters, etc.

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band, such as from 2.400 gigahertz (GHz) to 2.485 GHz. Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems such as headsets, headphones, speakers, etc., wearable devices such as smart watches, fitness trackers, etc., battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience errors due to noisy and/or congested transmission mediums. Such issues experienced with short-range wireless communications may degrade the performance of devices, may degrade a user experience, and so forth. Thus, a need exists for an approach for addressing one or more missed packets in short-range wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In BT audio, a data packet may sometimes be retransmitted from a master device up to 14 times upon the data packet being missed by the slave device. As retransmissions in BT audio are generally performed on an as-needed basis, an ability to perform more retransmissions only when needed may provide substantial robustness to the master device (e.g., in many instances no retransmissions are needed and, thus, no retransmissions are performed). In broadcast models, however, retransmission requires a pre-allocated time slot that is utilized regardless of whether a slave device has missed a data packet or not. As such, the cost of transmitting a same bit rate in a broadcast-oriented model versus a connection-oriented model is that more error time needs to be reserved in order to perform the broadcast, even though the error time may not be necessary in some cases. Given that a higher number of retransmissions may result in reduced performance of the master device, it may be desirable to perform a smaller number of retransmissions with respect to broadcast models.

Accordingly, described herein are techniques for offloading some of the retransmission time from the master device (e.g., a smartphone) to slave devices (e.g., earbuds) to provide an overall system with an improved audio robustness. More specifically, a first slave device may determine that a first data packet was improperly received from a master device and, as a result, transmit information to a second slave device indicating that the first data packet was improperly received, so that a corresponding data packet to the improperly received/missed data packet may be relayed from the second slave device to the first slave device.

In instances of jointly coded data, the second slave device may receive from the master device a first data packet included in a joint data stream of the slave devices, where the first data packet may be stored in memory of the second slave device. Subsequently, the second slave device may receive an indication from the first slave device that the first data packet was improperly received from the master device. In response thereto, the second slave device may retrieve the first data packet from its memory and relay the first data packet to the first slave device.

In instances of split coded/non-jointly coded data, where separate data streams correspond to separate slave devices, the second slave device may receive an indication that the first slave device improperly received a first data packet. Based on the indication, the second slave device may begin listening for the data stream of the first slave device (e.g., in addition to its own data stream) so that when a second data packet for the first slave device is received by the second slave device from the master device, the second slave device may relay the second data packet to the first slave device.

The aspects described herein may be utilized with respect to any standards-compliant broadcast transmitter, as only the receivers (e.g., the slave devices) need to be configured for executing the data packet relay operation.

In an aspect of the disclosure, a method, a computer-readable medium, and an apparatus are provided. The apparatus may be a first slave device that includes a memory and at least one processor coupled to the memory, where the at least one processor is configured to determine that a first data packet is improperly received from a master device, transmit, upon determining that the first data packet was improperly received, information to a second slave device indicating the first data packet was improperly received, and receive, based on the transmitted information, a second data packet from the second slave device.

In another aspect of the disclosure, a method, a computer-readable medium, and an apparatus are provided. The apparatus may be a second slave device that includes a memory and at least one processor coupled to the memory, where the at least one processor is configured to receive a first data packet from a master device, receive information from a first slave device indicating that the first data packet from the master device was improperly received, and transmit, based on the received information, the first data packet to the first slave device.

In a further aspect of the disclosure, a method, a computer-readable medium, and an apparatus are provided. The apparatus may be a second slave device that includes a memory and at least one processor coupled to the memory, where the at least one processor is configured to receive information from a first slave device indicating that a first data packet from a master device was improperly received, receive, based on the received information, a second data packet for the first slave device from the master device, and transmit, based on the received information, the second data packet to the first slave device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3B is a diagram illustrating a BLE protocol stack that may be implemented by a BLE device, in accordance with certain aspects of the disclosure.

DETAILED DESCRIPTION

Figure 1:
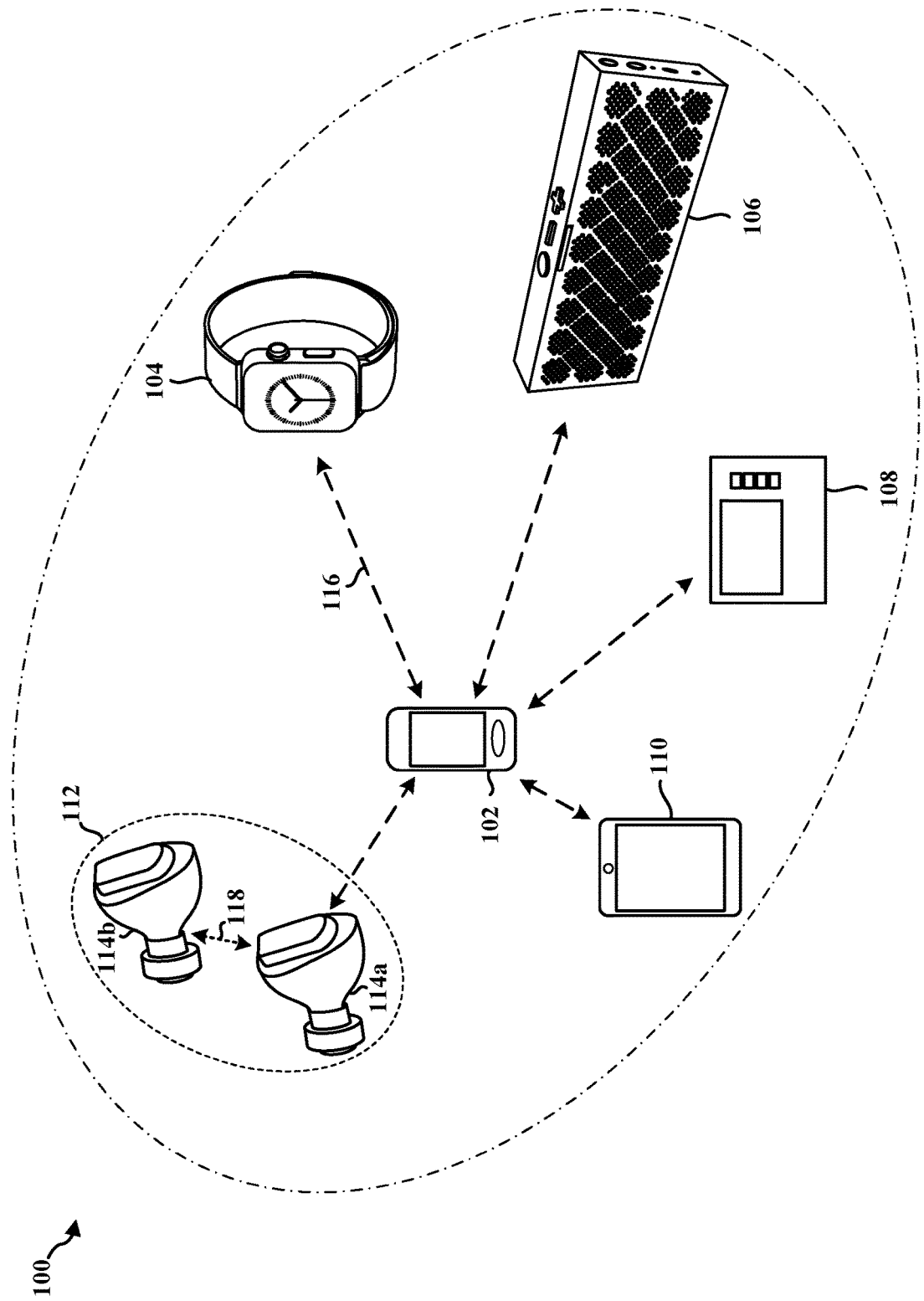
FIG. 1 is a diagram illustrating an example of a short-range wireless communications system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless source device 102 may use a communications link 116 to communicate with one or more peripheral devices 104, 106, 108, 110, 112 using a short-range wireless communications protocol. The short-range wireless communications protocol may include a Bluetooth® (BT) protocol and/or a BT Low Energy (BLE) protocol.

Examples of the source device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system (GPS), a multimedia device, a video device, a digital audio player, a camera, a game console, a tablet, a smart device, a wearable device, a vehicle, an ear piece, a wireless headset, an Internet-of-Things (IoT) device, or any other similarly functioning device.

Examples of the one or more peripheral devices 104, 106, 108, 110, 112 include a cellular phone, a smart phone, a SIP phone, a STA, a laptop, a PC, a desktop computer, a PDA, a satellite radio, a GPS, a multimedia device, a video device, a digital audio player, a camera, a game console, a tablet, a smart device, a wearable device, a vehicle, an ear piece (e.g., ear pieces 114a-114b), a wireless headset, an IoT device, or any other similarly functioning device. Although the source device 102 is illustrated in communication with six peripheral devices 104, 106, 108, 110, 112 in the WPAN 100, the source device 102 may communicate with more or fewer than six peripheral devices within the WPAN 100 without departing from the scope of the present disclosure.

A device, such as the source device 102, implementing the BT protocol may operate according to one radio mode, such as basic rate (BR)/enhanced data rate (EDR). Similarly, a device implementing the BLE protocol may operate according to a BLE radio mode. In some aspects, a device, such as the source device 102, may be configured with dual radio modes, and therefore may be able to operate according to the BR/EDR mode or the BLE mode, for example, based on the type of short-rage wireless communication in which the device may engage.

For example, the device may operate according to the BR/EDR mode for continuous streaming of data, for broadcast networks, for mesh networks, and/or for some other applications in which a higher data rate may be more suitable. However, the device may operate according to the BLE mode for short burst data transmissions and/or for some other applications in which power conservation may be desirable and/or a lower data rate may be acceptable. In other aspects, a device may operate according to one or more other radio modes, including proprietary radio modes, such as high speed radio modes, LE radio modes, isochronous radio modes, etc.

A short-range wireless communications protocol, such as BT, BLE, and/or BR/EDR, may include and/or may use one or more other communications protocols, for example, for establishing and maintaining communications links. As illustrated, the source device 102 may establish a communications link 116 with at least one other device, such as a wireless headset 112, according to at least one communications protocol for short-range wireless communications.

The communications link 116 may include a communications link that adheres to a protocol included and/or for use with BT, BLE, BR/EDR, etc. In one aspect, the communications link 116 may include an asynchronous connectionless (ACL) link. With ACL, the source device 102 may connect (or "pair" in the terminology of the BT specification) with a second device, such as the headset 112. The connection is asynchronous in that the two devices may not need to synchronize, time-wise, data communications between each other to permit communication of data packets via the communications link 116.

A Logical Link Control and Adaptation Protocol (L2CAP) may be used within the BT protocol stack to pass packets to either the host controller interface (HCI) or, for a "hostless" system, directly to the link manager/ACL link. An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In one aspect, the communications link 116 may include an Advanced Audio Distribution Profile (A2DP) link. An A2DP link provides a point-to-point link between a source device, such as the source device 102, and a sync device, such as the headset 112. With an A2DP link, data packets including audio may be transmitted over an ACL data channel, and other information, for example, for controlling the audio stream, may be transmitted over a separate control channel. The data packets may occur non-periodically.

In another aspect, the communications link 116 may support synchronous logical transport mechanisms between a "master device" and a "slave device." For example, the communications link 116 may include a synchronous connection-oriented (SCO) link. A SCO link may provide a symmetric point-to-point link between a master device, such as the source device 102, and a slave device, such as the headset 112, using time slots reserved for BT communications. However, a SCO link may not support retransmission of data packets, which may be unsatisfactory in audio streaming and/or voice use cases in which a dropped audio or voice packet may reduce the quality of the user experience.

In a further aspect, the communications link 116 may include an extended SCO (eSCO) link. An eSCO link may provide a symmetric or asymmetric point-to-point link between a master device and a slave device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. With an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped and the receiving device may continue to receive the stream without data from the dropped data packet.

In a further aspect, the source device 102 may establish the communications link 116 with the wireless headset 112. In some configurations, the wireless headset 112 may include two earpieces (114a and 114b) that implement a protocol stack, such as a BT protocol stack configured for BR/EDR, at respective components and/or circuits. Thus, the communications link 116 may be established at a protocol stack through a first or "primary" earpiece 114a of the headset 112. In effect, when the source device 102 establishes the communications link 116 with the headset 112, the communications link 116 may be established through the primary earpiece 114a. For example, a logical link, such as an ACL link, L2CAP link, etc., may exist at one or more layers of the protocol stack through the primary earpiece 114a. In some aspects, the secondary earpiece 114b may communicate over a short-range communications link 118 with the primary earpiece 114a. The short-range communications link 118 may be, for example, a BT link (e.g., BR/EDR link), a BLE link, a near-field magnetic induction (NFMI) link, or any other suitable short-range wireless communications link.

Due to various factors, wireless devices may cause congestion on the frequencies used for wireless channels, such as a wireless channel on which the communications link 116 is carried. Consequently, wireless communication channels, including the wireless communications channel on which the communications link 116 is carried, may be "noisy" in that static, congestion, and/or other interference may introduce random signals on the same frequency bands as those reserved to communicate over the established communications link 116. Such static, congestion, interference, and/or other random signals may cause errors to packets transmitted on the communications link 116 and/or may cause packets transmitted over the communications link 116 to be missed.

In some standards and protocols, such as BLE and/or BR/EDR, the source device 102 may detect errors in a packet and/or a dropped/missed/unreceived packet through the use of cyclic redundancy check (CRC) validation and through the use of message integrity code (MIC) validation. MIC validation may be used when a packet is encrypted. For example, failure of CRC validation may indicate one or more errors in a received packet and failure of MIC validation may indicate that another packet has not been received (although failure of CRC validation may also indicate another packet has not been received and/or failure of MIC validation may also indicate one or more errors in a received packet).

CRC validation and MIC validation may be based on generating CRC values and MICs, respectively, based on received packets and respectively comparing those generated CRC values and MICs to CRC and MICs included in received packets. Specifically, a receiving device that receives a packet, such as the headset 112, may first generate a CRC value or a CRC checksum based on the received packet, such as based on a payload and, if applicable, a MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines the received packet fails CRC validation, then the received packet may include errors and/or may be corrupted. In one configuration, the receiving device may discard the received packet that fails CRC validation; however, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate a MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation; however, in another configuration, the receiving device may attempt to recover the received packet.

Figure 2:
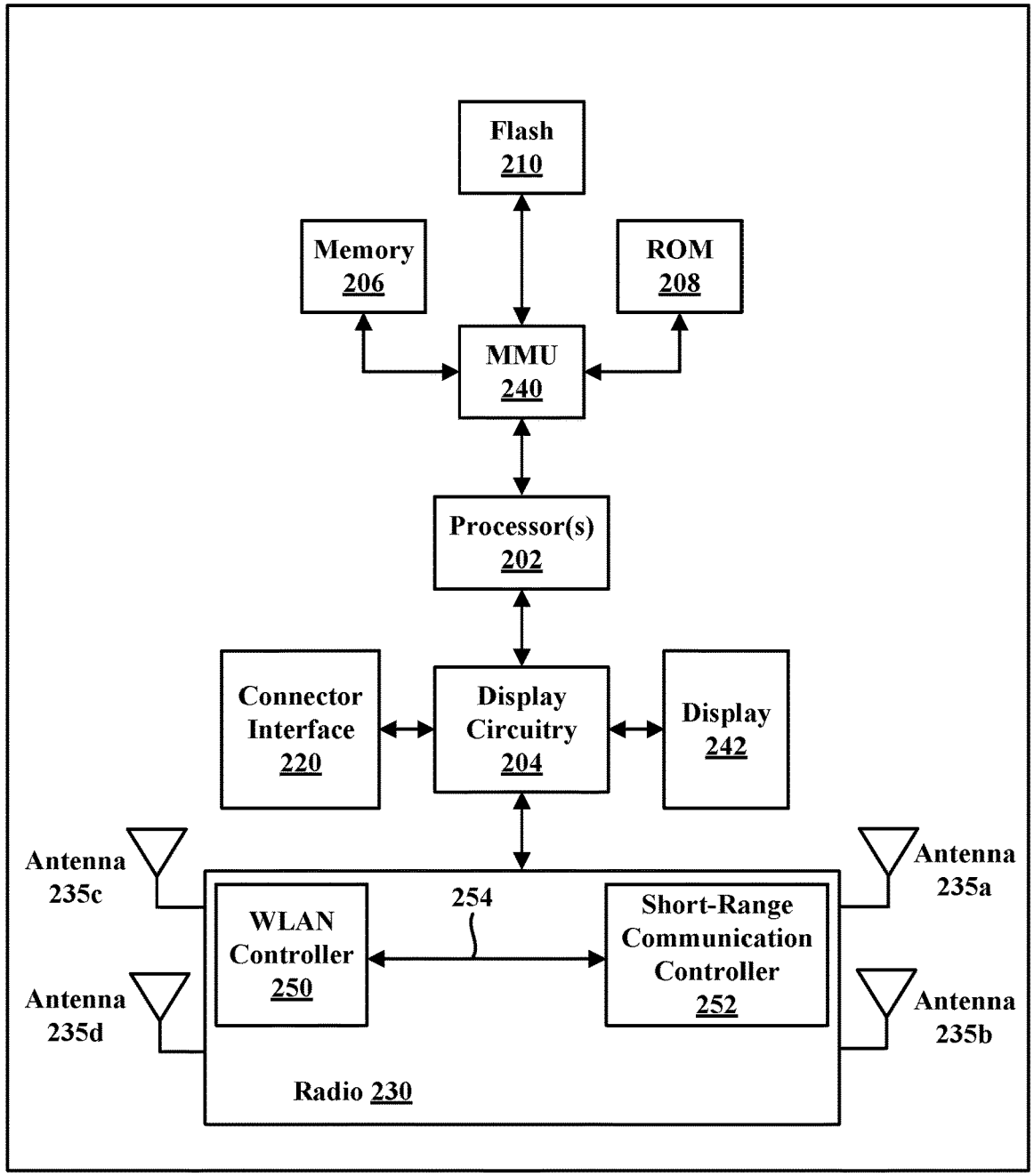
FIG. 2 is block diagram of a short-range wireless communications device, in accordance with certain aspects of the disclosure.

FIG. 2 is block diagram of a wireless device 200 in accordance with certain aspects of the disclosure. The wireless device 200 may correspond to, for example, the source device 102, and/or one of the peripheral devices 104, 106, 108, 110, 112 in FIG. 1. In certain configurations, the wireless device 200 may be, for example, a BT and/or BLE device that is configured to construct a PDU (e.g., an L2CAP PDU) using a selective relay mechanism for selectively relaying packets and/or corresponding information.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory, such as memory 206, ROM 208, Flash memory 210, and/or to other circuits or devices, such as the display circuitry 204, a radio 230, a connector interface 220, and/or the display 242. The MMU 240 may be configured to perform memory protection and page table translation or set up. In some aspects, the MMU 240 may be included as a portion of the processor(s) 202.

As shown, the processor 202 may be coupled to various other circuits of the wireless device 200. For example, the wireless device 200 may include various types of memory, the connector interface 220, which may allow for coupling to the computer system, the display 242, and/or wireless communications circuitry, which may facilitate Wi-Fi, BT, BLE, etc. The wireless device 200 may include a plurality of antennas 235a, 235b, 235c, 235d, for performing wireless communication with other short-range wireless communications devices, including BT devices, BLE devices, etc.

In certain aspects, the wireless device 200 may include hardware and software components (a processing element) configured to separately check the header of the data packet for errors and perform majority voting of a data packet, for example, using the techniques described herein. The wireless device 200 may also include firmware or other hardware/software for controlling short-range wireless communications operations, such as BT operations, BLE operations, etc. In addition, the wireless device 200 may store and execute a WLAN software driver for controlling WLAN operations.

The wireless device 200 may be configured to implement part or all of the error correction techniques described herein, for example, by executing program instructions stored on a memory medium, such as a non-transitory computer-readable memory medium, and/or through hardware or firmware operations. In other aspects, the error correction techniques described herein may be at least partially implemented by a programmable hardware element, such as an field programmable gate array (FPGA), and/or as an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications, such as BT communications, BLE communications, etc. A coexistence interface 254 may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (FIG. 3A, infra) and/or a BLE stack (FIG. 3B, infra), and communicate with at least one second wireless device using one or more of the antennas 235a, 235b, 235c, 235d. The short-range communications controller 252 may be configured to reconstruct a PDU (e.g., an L2CAP PDU) when the wireless device 200 is receiving or passively monitoring for packets sent by a source wireless device.

Figure 3A:
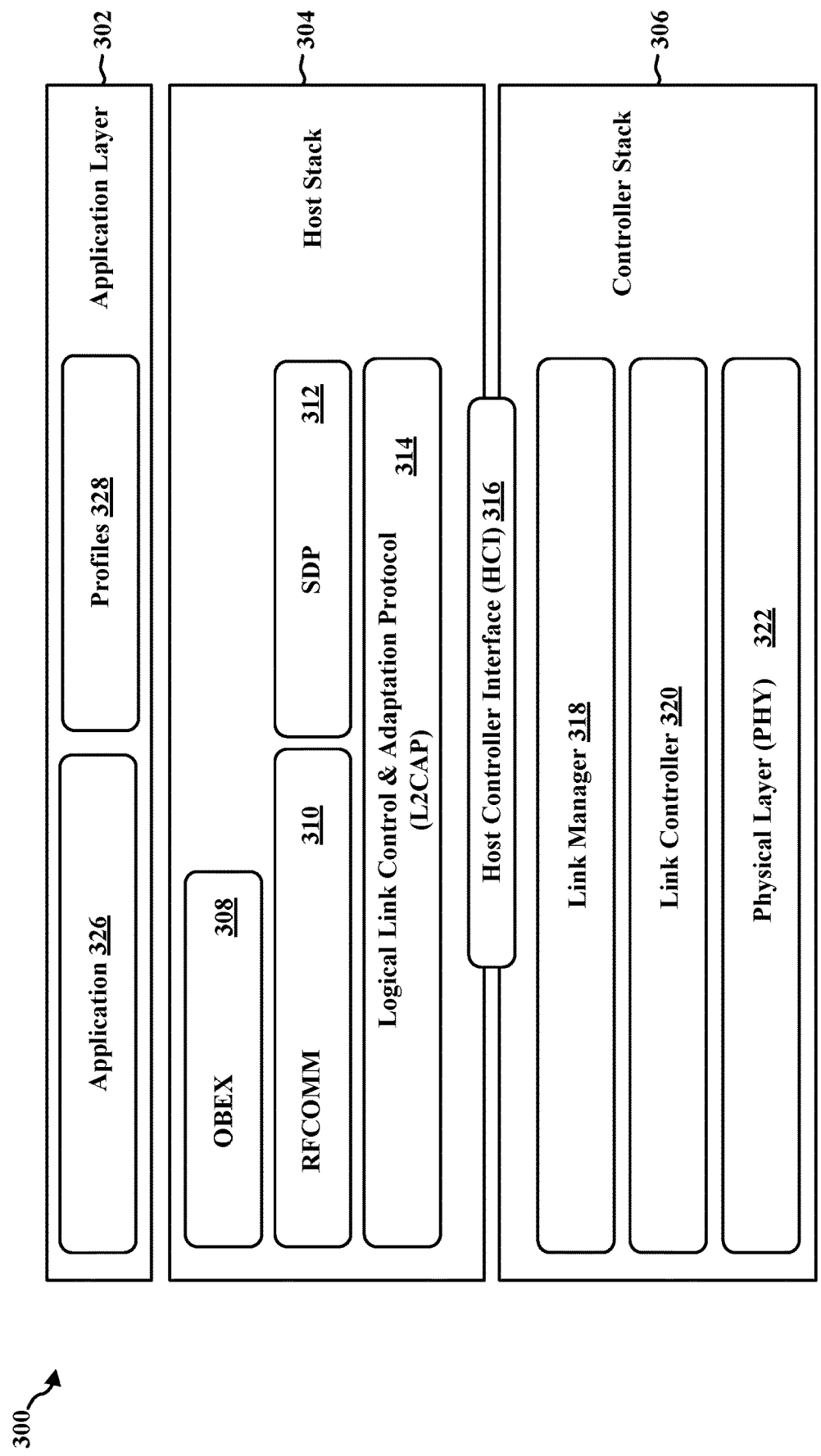
FIG. 3A is a diagram illustrating a BT protocol stack that may be implemented by a BT device, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by one or more of processor(s) 202, memory 206, Flash memory 210, ROM 208, the radio 230, and/or the short-range communication controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links, including logical links including ACL links, A2DP links, SCO links, eSCO links, ISO links, etc. The link controller 320 may be responsible for executing commands and instructions issued by a link manager 318, including establishing and maintaining links instructed by the link manager 318.

The link manager 318 may translate host controller interface (HCI) 316 commands into controller-level operations, such as baseband-level operations. The link manager 318 may be responsible for establishing and configuring links and managing power-change requests, among other tasks. Each type of logical link, such as ACL links, A2DP links, SCO links, eSCO links, ISO links, etc., may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—for example, the link manager 318 may translate HCI 316 commands into controller-level operations, such as baseband-level operations. The HCI 316 may act as a boundary between the lower layers, such as the controller stack 306, of the BT protocol stack 300 and the other layers of the BT protocol stack, such as the host stack 304 and/or the application layer 302. The BT specification may define a standard HCI to support BT systems that are implemented across two separate processors. For example, a BT system on a computer might use the BT system's own processor to implement the lower layers of the stack, such as the PHY layer 322, the link controller 320, and/or the link manager 318. The BT system might use a processor of a BT component to implement the other layers, such as the host stack 304 and the application layer 302. In some aspects, however, the BT system may be implemented on a same processor, and such a BT system may be referred to as a "hostless" system.

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links, such as logical links including ACL links, and/or requesting some links if those do not already exist. Further, the L2CAP layer 314 may implement multiplexing between different higher-layer protocols, such as SDP protocols and RFCOMM protocols, which may to allow different applications to use a single link, such as a logical link, including an ACL link. In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (such as a master device) and another L2CAP layer 314 at a receiving device (such as a slave device.

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client device initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionalities. The application 326 may access BT communications through one or more profiles 328, which may describe a variety of different types of tasks. By following procedures of one or more profiles 328, the application 326 may use BT communications according to a BT specification.

FIG. 3B illustrates a BLE protocol stack 350 that may be implemented in a BLE device. For example, the BLE protocol stack 350 may be implemented by one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices, and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (such as the controller stack 356) of the BLE protocol stack 350 and the other layers of the BLE protocol stack (such as the host stack 354 and the application layer 352). In addition, the host stack 354 may communicate with a BLE controller (such as the short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (for example, twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (such as the application layer 352).

The ATT 366 includes a client/server protocol based on attributes associated with a BLE device configured for a particular purpose (examples may include monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, for example, through a profile, which may define a collection of attributes and any permission needed for the attributes to be used in BLE communications. The GAP 360 may provide an interface for the application 358 to initiate, establish, and manage connections with other BLE devices.

In some aspects, a wireless device, such as the source device 102, the wireless device 200, etc., may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—for example, the L2CAP layers 314, 368 of the protocol stacks 300, 350 may be configured for dual mode short-range wireless communications using either BT or BLE.

Figure 4A:
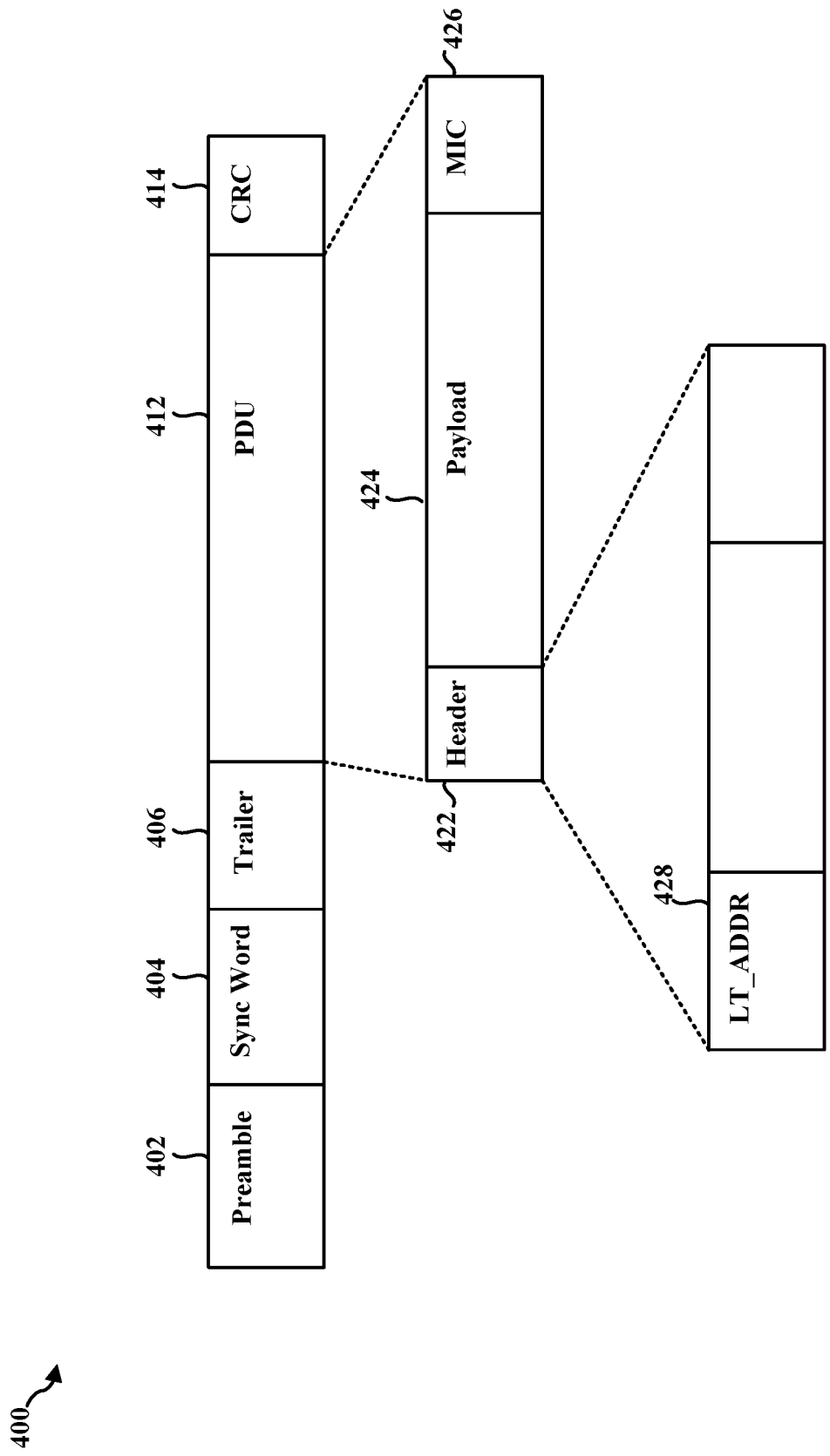
FIG. 4A is a diagram illustrating a BT data packet, in accordance with certain aspects of the disclosure.

FIG. 4A is a diagram illustrating a data packet 400 in accordance with certain aspects of the present disclosure. The data packet may be used with various short range wireless communications technologies, such as BT and BR/EDR. The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet, for example, when the data packet is encrypted. In other words, the MIC may be used by the receiving device to confirm and/or authenticate that the message came from the stated transmitting device, and to confirm that the payload 424 has not been changed (which may provide data packet integrity). The MIC 426 protects both payload integrity and the authenticity of the data packet 400 by enabling a receiving device which also possesses the secret key to detect any changes to the payload 424. In some aspects, the MIC 426 may be present when the packet 400 is encrypted (e.g., encrypted using AES-CCM encryption) but may be absent when the packet 400 is unencrypted.

In certain configurations, such as BR/EDR, the payload 424 (excluding the MIC 426 and header 422) may include an unencrypted baseband packet. For example, the payload 424 may include a payload portion (excluding a MIC and payload header) of an unencrypted baseband ACL-user data (ACL-U) packet.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link, including ACL, A2DP, eSCO, ISO, etc.

In certain configurations, the header 422 of the PDU 412 may include a logical link identifier (LLID). The LLID may be a two-bit field of the header 422.

Figure 4B:
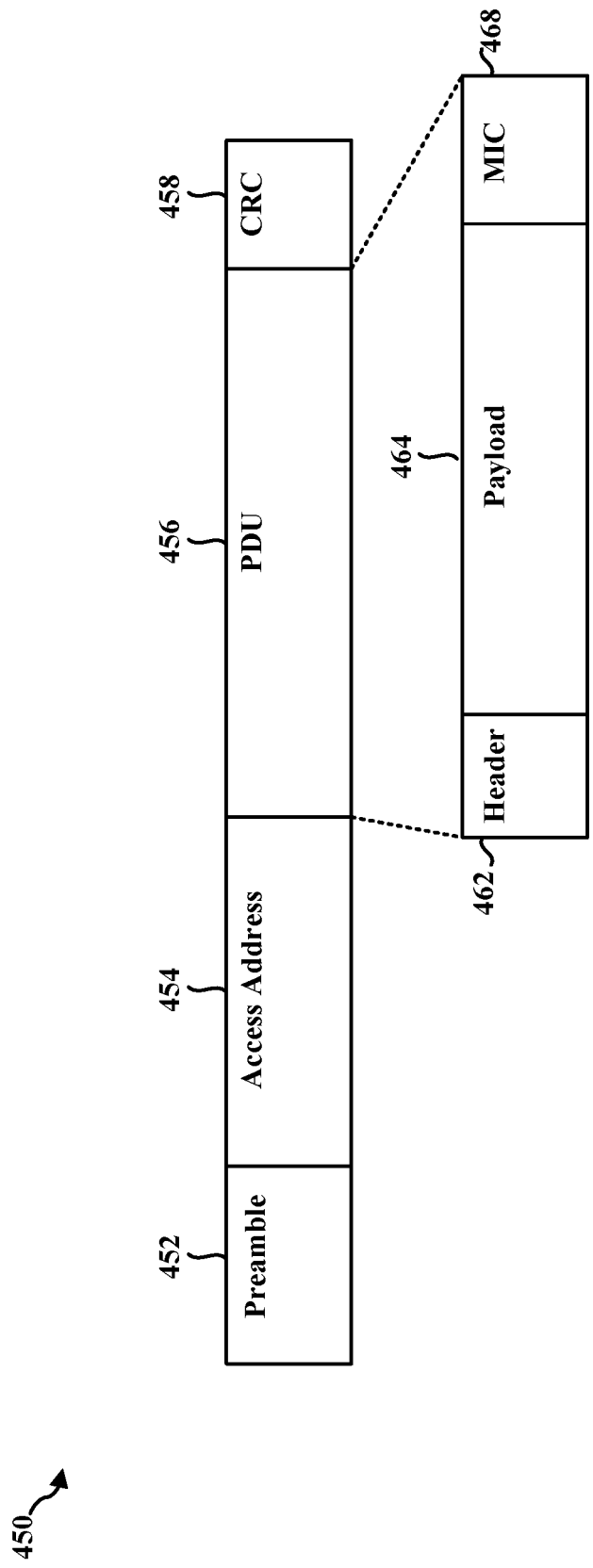
FIG. 4B is a diagram illustrating a BLE data packet, in accordance with certain aspects of the disclosure.

FIG. 4B is a diagram illustrating a data packet 450 in accordance with certain aspects of the present disclosure. The data packet may be used with various short range wireless communications technologies, such as BLE. The data packet 450 may include a preamble 452, an access address 454, a PDU 456, and a CRC 458. In certain configurations, the data packet 450 may not include the CRC 458.

In some aspects, the access address 454 may set the address of a link layer (such as the link layer 370) connection. For example, the access address 454 may include an address that indicates a type of logical link, including ACL, A2DP, eSCO, ISO, etc.

In certain configurations, the PDU 456 may include a header 462, a payload 464, and a MIC 468. The MIC includes information that may be used by to authenticate a data packet, for example, when the data packet is encrypted. In some aspects, the header 462 of the PDU 456 may include a plurality of fields, including at least an LLID, which may be a two-bit field.

In certain configurations, the payload 464 (excluding the MIC 468 and header 462) may include an unencrypted baseband packet. For example, the payload 464 may include a payload portion (excluding a MIC and payload header) of an unencrypted baseband ACL-U packet.

Figure 5A:
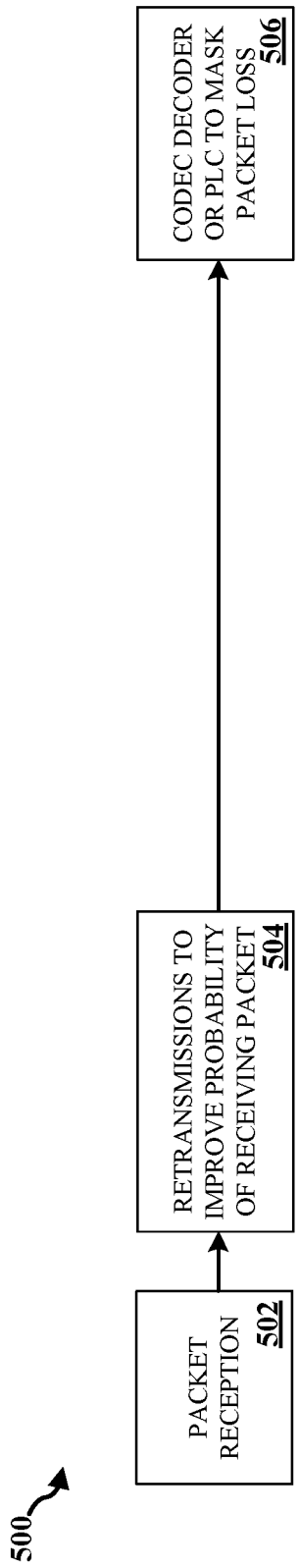
FIGS. 5A-5B illustrate techniques for improving audio robustness.
Figure 5B:
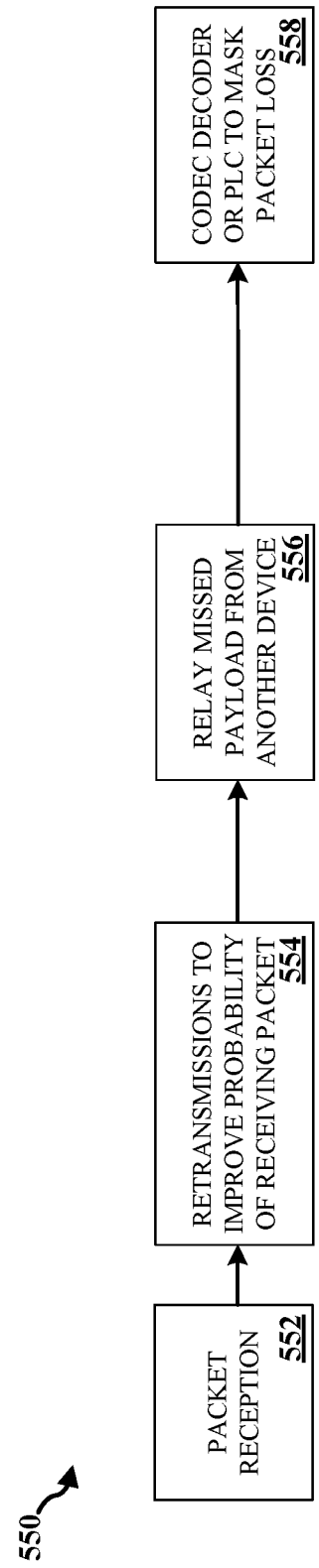

FIGS. 5A-5B illustrate approaches for improving audio robustness of a device, such as audio robustness during a broadcast mode of operation of the device. Audio robustness relates to a reliability for which transmitted audio packets are received and decoded at a receiving device. In other words, the audio robustness of a transmit device may correspond to how good reception and decoding is at the receiving device. In an aspect, wireless earbuds may be configured as separate receiving devices that correspond to each ear of an end user. The earbuds may be "slave" devices that receive broadcast audio signals from a "master" device, such as a smart phone or an MPEG-1/MPEG-2 audio layer III (mp3) player, that the earbuds are paired with.

Flowchart 500 begins with packet reception at block 502. For example, the master device may broadcast audio packets for reception by one or more slave devices, such as one or more earbuds. In LE audio broadcasts, retransmissions may be performed at block 504 to improve a probability that a transmitted audio packet will be received by a slave device. Retransmission refers to broadcasting a same audio packet a plurality of times (e.g., 3 or 4 times) to improve the chances that the audio packet will be received and decoded by the slave device. As long as one of the transmitted/re-transmitted audio packets is properly received by the slave device, a codec is able to decode the packet at block 506, so that the slave device can output corresponding audio. In contrast, if none of the transmitted/re-transmitted audio packets are properly received and decoded by the slave device, packet loss concealment (PLC) may be executed at block 506 to help mask the fact that an audio packet is missing from the audio stream. Accordingly, flow diagram 500 includes two results—either at least one data packet is properly received by the slave device, in which case the data packet may be decoded by the codec at block 506, or none of the transmitted/retransmitted data packets are properly received by the slave device, in which case the slave device may execute PLC at block 506 with respect to the missing data packet.

Flow chart 550 is similar to flow chart 500 in that the flow chart 550 begins with packet reception at block 552 and subsequently performs retransmission at block 554 to improve the probability that a specific audio packet will be received by the slave device, such as by broadcasting the specific data packet 3 or 4 times. However, flow chart 550 differs from flow chart 500 in that the flow chart 550 includes a feature at block 556 for relaying a missed payload from another device. Thus, block 556 serves as an additional measure in the flow chart 550 configured to reduce a number of instances in which PLC may need to be executed at block 558.

More specifically, if none of the audio packets retransmitted at block 554 are properly received and decoded by a first slave device, the relay feature at block 556 may be employed as a safeguard that allows the missing audio packet to be forwarded/relayed from the second slave device, so that the first slave device can receive the missing packet and output audio that may be of better quality than the audio output using the technique of flowchart 500 when a packet is missed. In the case of earbuds, the relay feature may be utilized, for example, in situations where one earbud is able to reliably identify a broadcast from a smartphone and the other earbud is operating with marginal performance (e.g., not reliably identifying broadcast packets), thereby allowing the earbud with the marginal performance to potentially increase the quality of its audio output based on the relayed audio packet. As a result of receiving the audio packet via the relay feature at block 556, the codec may have valid data to decode at block 558, rather than executing PLC at block 558, since executing PLC more than a threshold percentage of time may cause undesirable audio artifacts to be perceived in the audio output.

Figure 6:
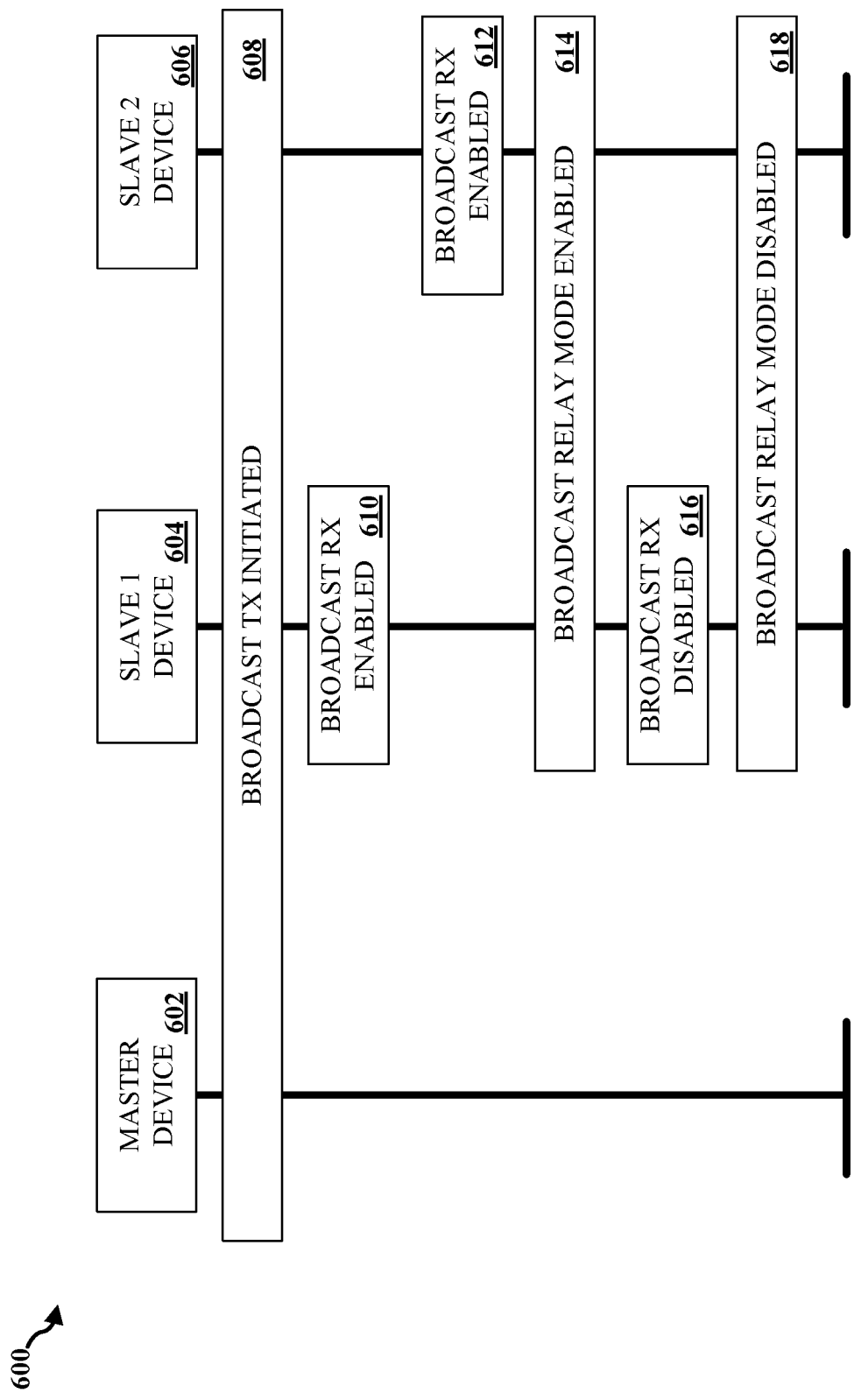
FIG. 6 is a message sequence diagram for broadcast relay.

FIG. 6 is a message sequence diagram 600 for a broadcast relay mode for LE audio communication. In order to increase the reliability of LE audio communication for slave devices, such as earbuds, the slave devices may enable a relay mode in both connection-oriented and broadcast modes of the LE audio. The message sequence diagram 600 includes a master device 602 in communication with a first slave device 604 (e.g., a first wireless earbud) and a second slave device 606 (e.g., a second wireless earbud). The slave devices 604-606 are configured to receive packets from the master device 602. Further, both slave devices 604-606 may support a link manager protocol for configuring and/or enabling the broadcast relay mode. The broadcast relay mode may use the same PHY layer as an associated ACL connection between the slave devices 604-606. As the parameters needed to enable the broadcast relay mode may be obtained from values utilized in the broadcast itself or from the ACL connection, further signaling may not be required to enable the broadcast relay mode beyond that needed to establish the ACL connection between the slave devices 604-606.

At 608, broadcast transmissions for the first slave device 604 and the second slave device 606 are initiated by the master device 602. Additionally, at 610, the first slave device 604 enables broadcast reception and, at 612, the second slave device 606 enables broadcast reception. At this point in the message sequence diagram 600 the slave devices 604-606 are listening for their respective packets from the master device 602. The slave devices 604-606 may be configured to execute a communication protocol that enables communication between the slave devices 604-606 themselves. Accordingly, at 614, the broadcast relay mode is enabled, which may indicate that one of the slave devices 604-606 is to listen for/relay the packets of the other slave device. In some aspects, the broadcast relay mode is negotiated by the slave devices 604-606 to define when/how missed packets are to be exchanged. At 616, broadcast reception is disabled by the first slave device 604. In an example, broadcast reception may be disabled based on an end user removing one of the earbuds from his/her ear. Disabling broadcast reception at 616 may further cause the communication protocol to disable the broadcast relay mode at 618.

When broadcast relay mode is enabled, broadcast isochronous group (BIG) events may remain unchanged. BIG events include multiple broadcast isochronous stream (BIS) events, which may correspond to the separate slave devices 604-606 (e.g., separate left and right earbuds); and the BIS events may include multiple subevents, where each subevent is associated with transmission or reception of a packet. It is to be appreciated, however, that while BIG events among the master device 602 and the slave devices 604-606 may remain unchanged, a BIG relay piconet event may be added subsequent to a BIG event x and prior to a BIG event x+1 for relay of the missing packets between the slave devices 604-606. The BIG relay piconet event may be similarly configured with one or more subevents for transmission and reception of the missing packet between the slave devices 604-606.

The master of the piconet between the slave devices 604-606 may transmit a packet in a master-to-slave relay subevent and the slave of the piconet may receive the packet in a slave-to-master relay subevent. A first subevent in the relay piconet subevents may be a (synchronization) SYNC subevent, where the slave devices 604-606 transmit a LE_SYNC packet that indicates which packets in the BIG relay piconet subevent were missed. If no packets were missed, the slave does not transmit the LE_SYNC packet. Further, if neither of the slave devices 604-606 transmit in the SYNC subevent, no subsequent subevents are utilized in the BIG relay piconet event. However, if at least one of the slave devices 604-606 does transmit the LE_SYNC packet, subsequent subevents may be used for exchanging the missed packet.

In the case of isochronous channels (e.g., BIS channels), the timing of when packets are expected to arrive at the slave devices 604-606 is determined based on anchor points in the data stream. The anchor points may correspond to both BIG anchor points and BIS anchor points that respectively indicate when the BIG event or BIS event is scheduled to begin. If a slave device does not receive a packet in a particular BIS subevent, the slave device may determine that it has missed a packet with respect to that BIS subevent. As such, the broadcast relay mode may need to be enabled.

Figure 7:
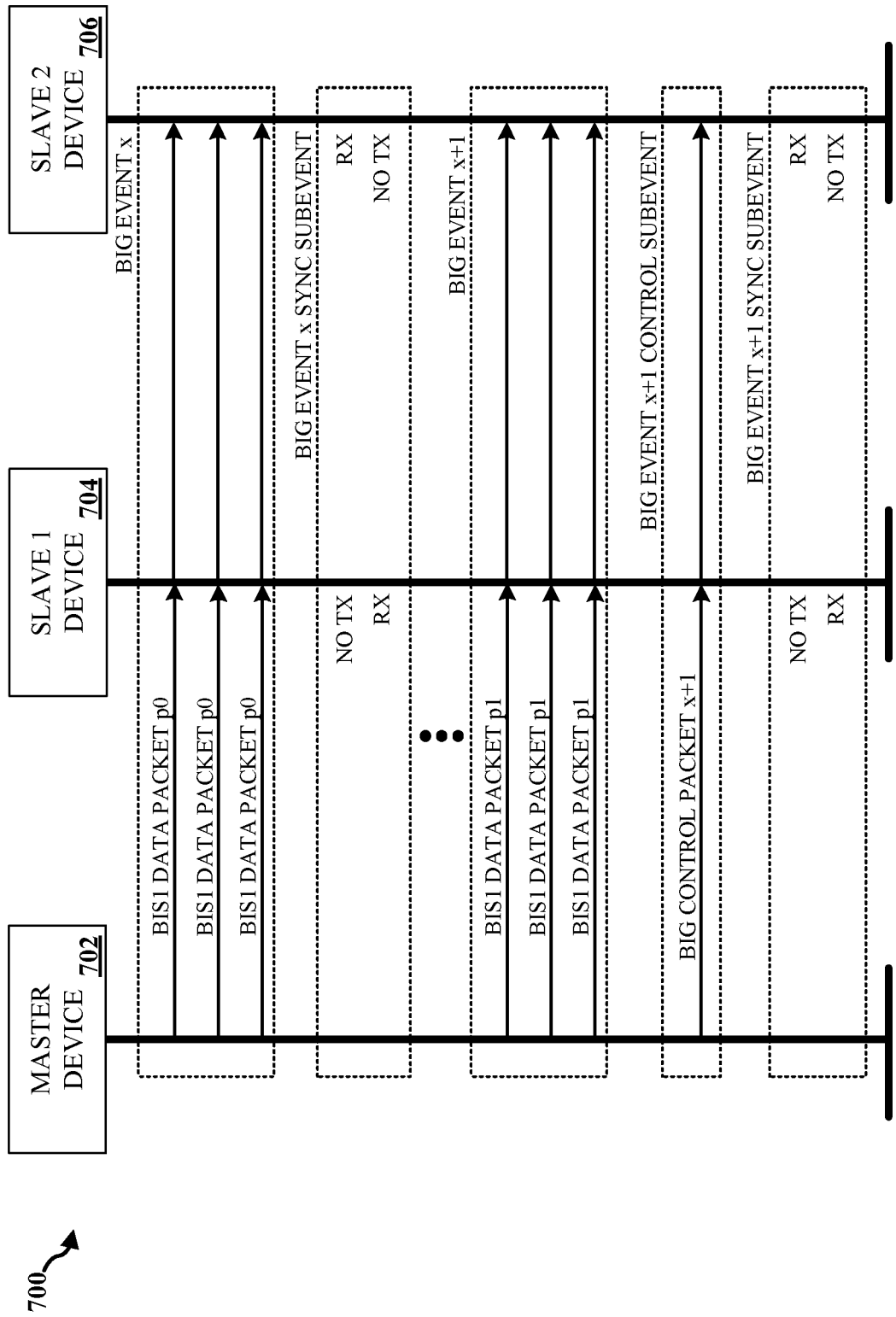
FIG. 7 is a communications diagram that illustrates a master device successfully broadcasting packets to each of a first slave device and a second slave device.

FIG. 7 illustrates a communications diagram 700 where a master device 702 successfully broadcasts packets to each of a first slave device 704 and a second slave device 706 (e.g., with and without a control subevent). In the communications diagram 700, the master device 702 transmits data packet p0 to the first slave device 704 and the second slave device 706 on three different occasions in BIS 1 of BIG event x. Since at least one of the p0 data packet transmissions (e.g., in this case all three of the p0 data packet transmissions) were properly received by the slave devices 704-706, the BIG event x SYNC subevent does not need to occur and, as a result, power consumption by the overall system may be reduced. The BIG event x, SYNC subevent may correspond to the BIG relay piconet event SYNC subevent, discussed above.

Subsequently in the communications diagram 700, the master device 702 successfully transmits data packet p1 to the first slave device 704 and the second slave device 706 on at least one occasion such that the BIG event x+1 SYNC subevent similarly does not need to occur. Here, data packet p1 is successfully transmitted from the master device 702 to the first slave device 704 and the second slave device 706 on all three occasions in BIG event x+1. Additionally, the master device 702 may transmit control packets, such as BIG control packet x+1, to the first slave device 704 and the second slave device 706 in a BIG event x+1 control subevent, subsequent to the data packet p1 being transmitted to the first slave device 704 and the second slave device 706.

The communications diagram 700 may relate to transmission of data packets that are jointly coded. Audio packet coding generally corresponds to one of two configurations: (1) joint coding; and (2) split coding/non-joint coding. In joint coding, data for the first slave device 704 and the second slave device 706 is encoded together, such that a same audio packet is transmitted to both of the slave devices 704-706. That is, an entire frame may be broadcast to the slaves devices 704-706, where both slave devices 704-706 are listening for the same transmission. For audio data, the frame may be 10 ms in duration and each of the slave devices 704-706 may be configured with a codec that decodes a respective portion of the total frame (e.g., respective portions corresponding to left earbud audio information v. right earbud audio information). In the case of joint coding, a BIS 2 may not be included in the data stream, as all the data for the first slave device 704 and the second slave device 706 may be included in the transmitted frame. In contrast to joint coding, split coding may be utilized to transmit separate data streams to the first slave device 704 and the second slave device 706.

Figure 8:
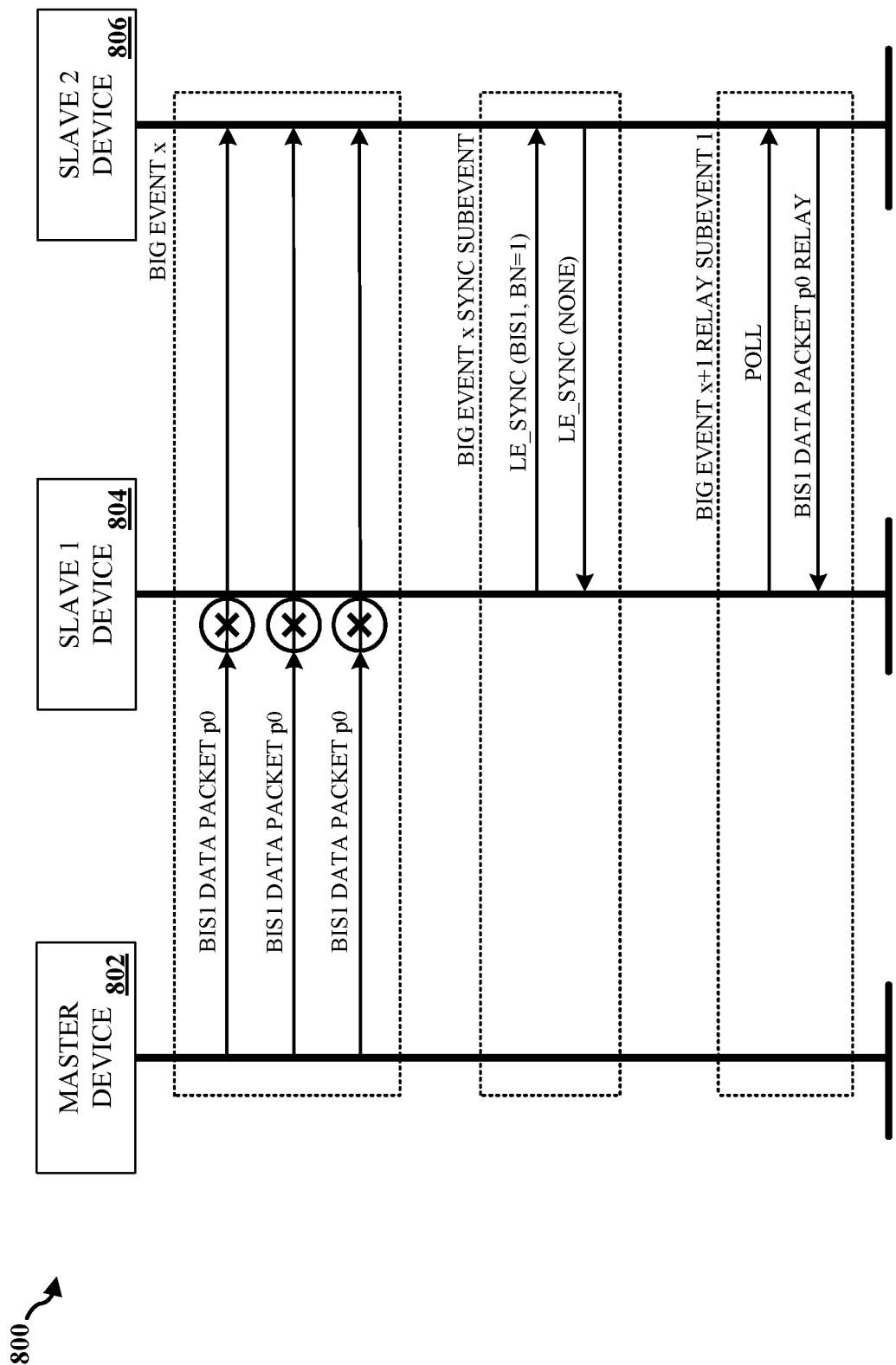
FIG. 8 is a communications diagram that illustrates a packet broadcast from a master device, but not successfully received by a first slave device.

FIG. 8 illustrates a communications diagram 800 where a packet is broadcast from a master device 802 but is not successfully received by a first slave device 804. For example, data packet p0 may be broadcast in BIS 1 of BIG event x and retransmitted a plurality of times. In communications diagram 800, the data packet p0 is not received by the first slave device 804 in any of the initial transmission or the retransmissions. However, a second slave device 806 does successfully receive the data packet p0 in at least one transmission from the master device 802 (e.g., p0 is successfully received in all three transmissions from the master device 802, as illustrated).

In BIG event x Sync subevent, the first slave device 804 that is missing the data packet p0 may transmit a sync packet to the second slave device 806 that successfully received the data packet p0. The sync packet may be a LE_SYNC packet that identifies the payload that the first slave device 804 is missing (e.g., BIS1, burst number (BN)=1). The data packet(s) that the first slave device 804 is missing is identified by the second slave device 806 based on the received sync packet. The second slave device 806 then transmits a response to the sync packet, where the response is received by the first slave device 804. The response may indicate that the second slave device 806 is not missing any of the data packets requested by the first slave device 804 (e.g., LE_SYNC (none)).

Upon receiving the response from the second slave device 806, the first slave device 804 may poll the second slave device 806 for the missing data packet in a BIG event x+1 relay subevent 1. In some aspects, the first slave device 804 may poll the second slave device 806 a plurality of times via POLL packets until the second slave device 806 transmits the missing data packet to the first slave device 804. For example, the second slave device 806 may transmit data packet p0 via a BIS1 relay. Such a relayed exchange of data between the slave devices 804-806 in a separate subevent provides an additional retransmission opportunity for the slave devices 804-806 to receive a previously missed data packet.

In instances of jointly coded data packets, the sync packet transmitted from the first slave device 804 to the second slave device 806 identifies, for the second slave device 806, the BIS and the BN of the missing data packet. Since both slave devices 804-806 are listening for the same data packets in a joint coded configuration, the second slave device 806 may already have the missing data packet stored in its memory. Thus, the second slave device 806 may be able to relay the missed packet to the first slave device 804 immediately upon being prompted. With respect to a jointly coded data configuration, a reduced cost may thereby be provided for maintaining the relay mechanism in a continually enabled state.

In cases where the data is split coded and the slave devices 804-806 are listening for two separate data streams (e.g., separate data streams for a left and a right earbud), there may be an increased power consumption cost when one of the devices is requested to listen for the data stream of the other device in addition to listening for its own data stream. As such, it may be more desirable to enable the relay mechanism on an as-needed basis with respect to split coded data configurations. For example, the request to enable the relay mechanism may not be sent from the first slave device 804 to the second slave device 806 until after a first data packet is missed by the first slave device 804. That is, the PLC may be utilized by the first slave device 804 to conceal the first missed packet and then, for subsequently missed packets, the relay mechanism may be utilized to relay the missed packets to the first slave device 804 after the second slave device 806 has begun listening for both data streams.

Split coded data may require collaborative robustness between the slave devices 804-806, such as requesting the second slave device 806 to listen for the data packets on a broadcast stream for the first slave device 804 when the first slave device begins missing its data packets. In some aspects, the request may be initiated based on an ALT_BIS_Assist feature. The ALT_BIS_Assist feature may be executed before a threshold number of data packets is missed by the first slave device 804 so that if a sync message is transmitted to the second slave device 806, the second slave device 806 would already be listening for and storing the data packets requested via the sync message. Thus, even though the second slave device 806 may not have been decoding the data packets of the first slave device 804, the data packets may still be stored in memory of the second slave device 806 and may be relayed to the first slave device 804 upon request.

The ALT_BIS_Assist feature may be triggered based on a received signal strength being below a threshold signal strength or a packet error rate exceeding a threshold packet error rate. For example, the slave devices 804-806 may determine a base threshold signal strength at which the receivers of the slave devices 804-806 are configured to receive a signal. Thus, the signal strength of the signal received from the master device 802 may be compared to the base threshold signal strength to determine whether the signal strength is above or below the base signal strength threshold. If the signal strength is below the base threshold signal strength, broadcast relay mode may be enabled. Additionally or alternatively, if the slave devices 804-806 detect that packets are being missed, relay mode may be enabled to provide further assurances that the packets are getting properly delivered to the respective slave devices 804-806. For example, interference may cause one or more packets to be missed by one of the slave devices, which may thereby cause the relay mode to be enabled to relay the missed one or more packets to the other slave device.

In BT audio as many as 14 retransmissions may occur. This can provide substantial robustness, as retransmissions in BT audio are performed only as-needed upon missing a packet (e.g., in many instances no retransmissions may be performed). For broadcast models, however, retransmission requires a pre-allocated time slot that is used regardless of whether a device has missed a packet or not. Thus, the cost of transmitting a same bit rate in a broadcast-oriented model versus a connection-oriented model is that more error time needs to be reserved in order to perform the broadcast, even though the reserved error time may not be necessary. Given that an increased number of retransmissions with respect to broadcast generally results in reduced performance of the master device 802, the broadcast relay mode described herein is configured to shift some of the retransmission time from the master device 802 to the slave devices 804-806 to provide an overall system with an increased audio robustness. The concepts described herein may be utilized with respect to any standards-compliant broadcast transmitter, as only the receivers (e.g., the slave devices 804-806) need to be configured to perform the relay of the data packets.

Figure 9:
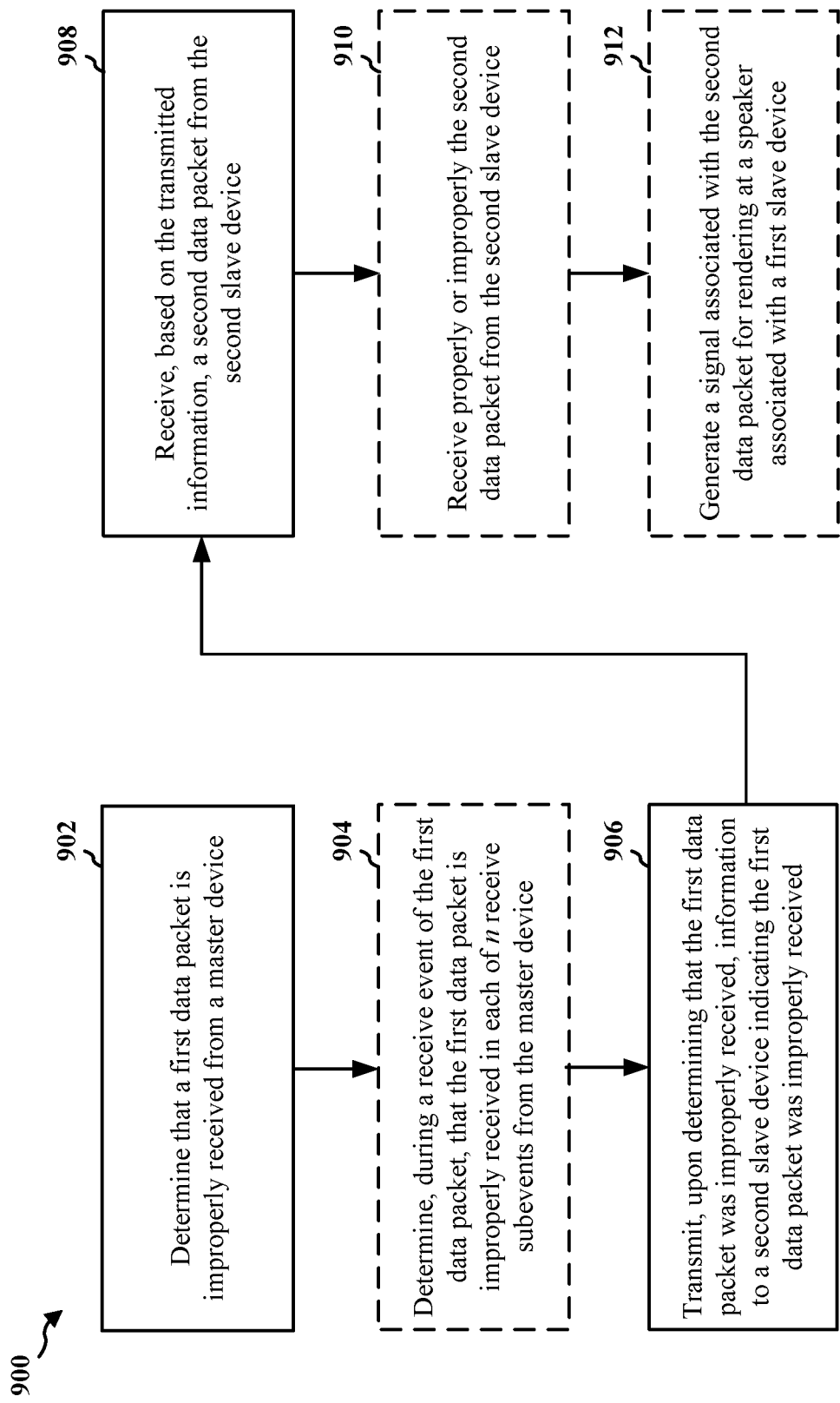
FIG. 9 is a flowchart of a method of wireless communication of a first slave device.

FIG. 9 is a flowchart 900 of an example method of wireless communication of a first slave device in accordance with one or more techniques of this disclosure. The method illustrated in the flowchart 900 may be performed by a wireless source device (e.g., a master device), a peripheral device (e.g., a slave device), or any other wireless communication device, as used in connection with the examples of FIGS. 1-8.

At 902, the first slave device determines that a first data packet is improperly received from a master device. For example, referring to FIG. 8, the first slave device 804 may determine that the BIS1 data packet p0 was improperly received from the master device 802. The first data packet may be a unicast data packet that is improperly received from the master device 802 over a synchronous connection-oriented (SCO) link or the first data packet (e.g., the BIS1 data packet p0) may be a broadcast data packet from the master device 802.

At 904, in determining that the first data packet is improperly received, the first slave device 804 may further determine during a receive event of the first data packet that the first data packet is improperly received in each of n receive subevents from the master device. For example, referring to FIG. 8, the communications diagram 800 is indicative of n=3 receive subevents for the first slave device 804. In each of the 3 receive subevents, the first slave device 804 may determine that the BIS1 data packet p0 is improperly received from the master device 802. A receive event may be a BIG event and the receive subevents may be BIS subevents, as illustrated in the communications diagrams 700-800.

At 906, the first slave device transmits, upon determining that the first data packet was improperly received, information to a second slave device indicating the first data packet was improperly received. For example, referring to FIG. 8, the first slave device 804 may transmit a sync packet to the second slave device 806 indicating that the BIS1 data packet p0 was improperly received by the first slave device 804. The transmitted information may include an identifier of the first data packet (e.g., BIS1, BN=1) that was improperly received by the first slave device 804. Additionally or alternatively, the transmitted information may include a request for the second slave device 806 to listen for data packets from the master device for the first slave device 804 and, upon receiving the data packets from the master device for the first slave device 804, at least one of forward the data packets from the master device for the first slave device 804 to the first slave device 804 or store the data packets at the second slave device 806.

At 908, the first slave device receives, based on the transmitted information, a second data packet from the second slave device. For example, referring to FIG. 8, the first slave device 804 may receive, based on a poll of the second slave device 806, the data packet p0 in a BIS1 relay subevent. In aspects, the second data packet and the first data packet may be at least one of a same data packet or associated with a same content. That is, while the second (relayed) data packet may be identical to the first data packet, the second data packet may alternatively represent the same content as the first data packet but not be identical to the first data packet. For instance, in order to be relayed more efficiently, the payload may be fragmented into one or more packets, aggregated with one or more other payloads, and/or be a subset of an original payload (e.g., an original payload may include audio data for both the first and second slave devices; however, only the audio data for the first slave device may need to be relayed to the first slave device). Transmitting the payload from the master device and relaying the second data packet may also be based on different wireless communication techniques (e.g., transmissions from the master device may be based on a Bluetooth connection and a link between the first and second slave devices may be based on a different type of connection). As such, a structure of the data packet for the different wireless communication techniques may be different, even if the payloads of the first and second data packets are indicative of the same content. Additionally or alternatively, the first data packet and the second data packet may each comprise a BLE audio data packet.

At 910, the first slave device may receive properly or improperly the second data packet from the second slave device, where the second data packet is subsequent to the first data packet. For example, referring to FIG. 8, the BIS1 data packet p0 is relayed from the second slave device 806 to the first slave device 804 subsequent to the BIS1 data packet p0 being improperly received by the first slave device 804 from the master device 802.

At 912, the first slave device may generate a signal associated with the second data packet for rendering at a speaker associated with the first slave device. For example, referring to FIG. 8, the first slave device 804 may receive a relay signal including the data packet p0 that causes the first slave device 804 to generate a signal for rendering at a speaker associated with the first device 804.

Figure 10:
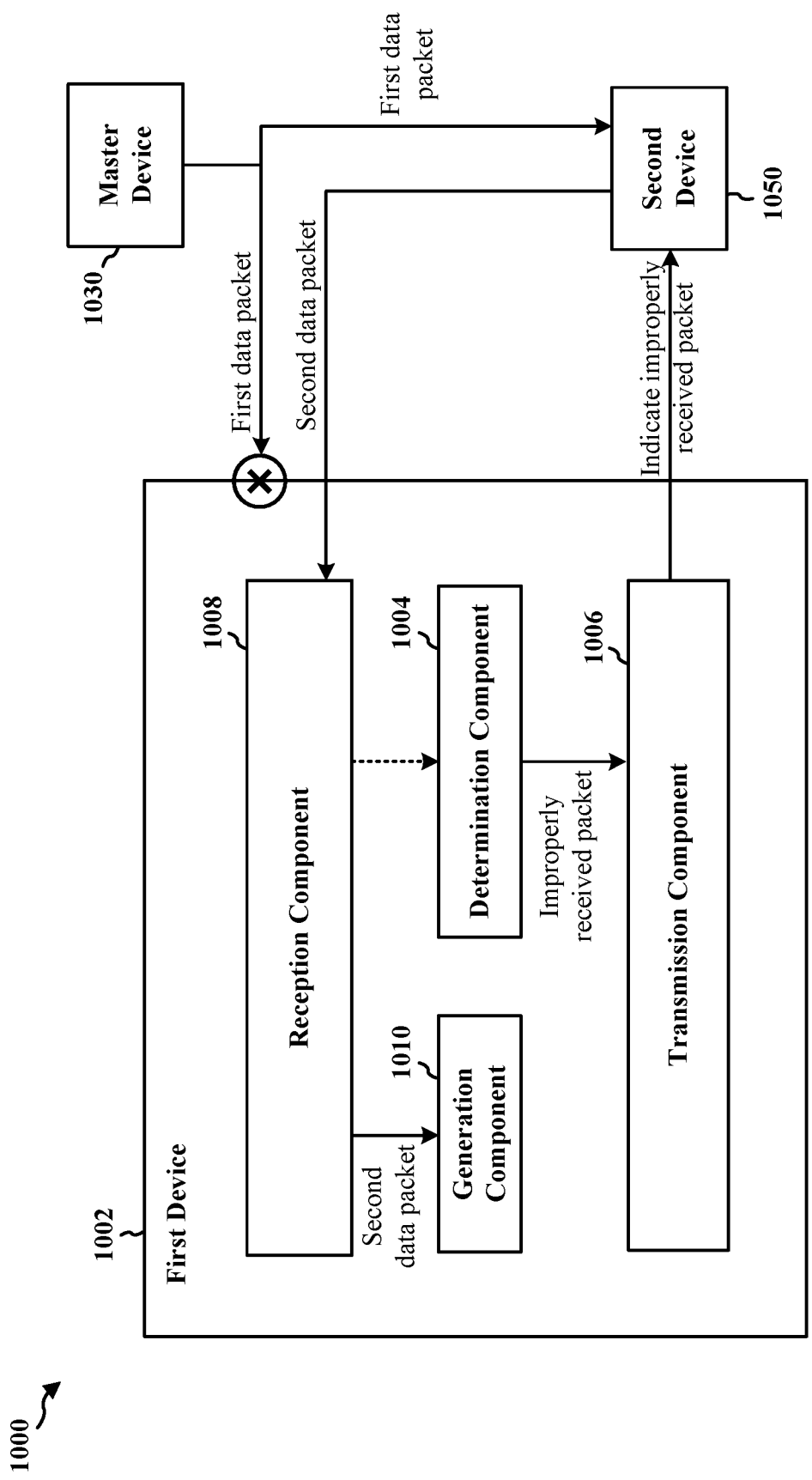
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus 1002 may be a wireless communication device (e.g., a slave device, a master device, etc.) or any other similar apparatus. The apparatus 1002 includes a determination component 1004 that determines whether a data packet, such as a first data packet, is properly received by a reception component 1008 from a master device 1030. For example, as described in connection with 902, the determination component 1004 may determine that a first data packet is improperly received from a master device (e.g., the master device 1030). As further described in connection with 904, the determination component 1004 may determine that the first data packet is improperly received from the master device 1030 based on a receive event of the first data packet, where the first data packet is improperly received in n subevents from the master device 1030.

The apparatus 1002 includes a transmission component 1006 that transmits an indication of an improperly received data packet to a second device 1050. For example, as described in connection with 906, the transmission component 1006 may transmit, up determining that the first data packet was improperly received, information to a second slave device indicating the first data packet was improperly received. The second device 1050 may transmit a second data packet to the apparatus 1002 based on reception of the first data packet by the second device 1050 from the master device 1030. The second data packet may correspond to the first data packet.

The apparatus 1002 includes a reception component 1008 configured to receive the second data packet from the second device 1050. For example, as described in connection with 908, the reception component 1008 may receive based on the transmitted information, a second data packet from the second slave device. Further, as described in connection with 910, the second data packet may be properly or improperly received by the reception component 1008 from the second device 1050. The second data packet, when properly received by the reception component 1008, may be provided to a generation component 1010 that generates a signal for rendering a speaker associated with the apparatus 1002. For example, as described in connection with 912, the generation component 1010 may generate a signal associated with the second data packet for rendering at a speaker associated with the first slave device.

The apparatus 1002 may include additional components that perform each of the blocks of the algorithm in the aforementioned flowchart of FIG. 9. As such, each block in the aforementioned flowchart of FIG. 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
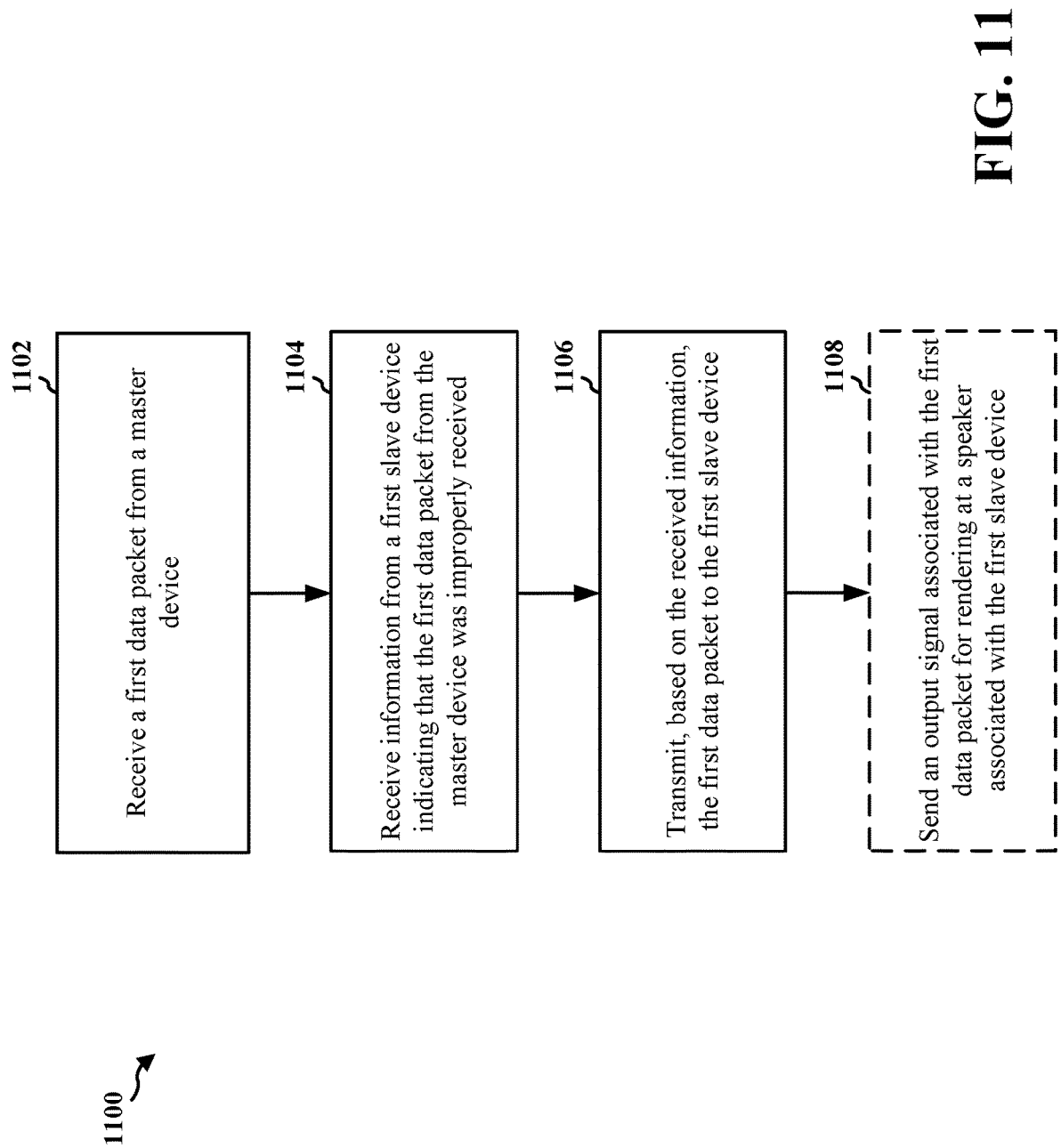
FIG. 11 is a flowchart of a method of wireless communication of a second slave device.

FIG. 11 is a flowchart 1100 of an example method of wireless communication of a second slave device in accordance with one or more techniques of this disclosure. The method illustrated in the flowchart 1100 may be performed by a wireless source device (e.g., a master device), a peripheral device (e.g., a slave device), or any other wireless communication device, as used in connection with the examples of FIGS. 1-8.

At 1102, the second slave device receives a first data packet from a master device. For example, referring to FIG. 8, the second slave device 806 receives BIS1 data packet p0 from the master device 802. The first data packet (e.g., BIS1 data packet p0) may be a unicast data packet from the master device 802 or the first data packet (e.g., BIS1 data packet p0) may be a broadcast data packet from the master device 802.

At 1104, the second slave device receives information from a first slave device indicating that the first data packet from the master device was improperly received. For example, referring to FIG. 8, the second slave device 806 may receive a sync packet from the first slave device 804 in a sync subevent that indicates the BIS 1 data packet p0 was improperly received from the master device 802. The received information may include an identifier of the first data packet (e.g., BIS1, BN=1) that was improperly received by the first slave device 804.

At 1106, the second slave device transmits, based on the received information, the first data packet to the first slave device. For example, referring to FIG. 8, the second slave device 806 may transmit to the first slave device 804, based on a poll of the second slave device 806, the data packet p0 in a BIS1 relay subevent. Further, the first data packet may comprise a BLE audio data packet.

At 1108, the second slave device may send an output signal associated with the first data packet for rendering at a speaker associated with the first slave device. For example, referring to FIG. 8, the second slave device 806 may send a relay signal including the data packet p0 that causes a speaker associated with the first slave device 804 to render at the first slave device 804. The first data packet (e.g., the data packet p0) may be received by the second slave device 806 during a receive BIS event of a receive BIG event for the first slave device 804 and the second slave device 806, as illustrated in the communications diagrams 700-800.

Figure 12:
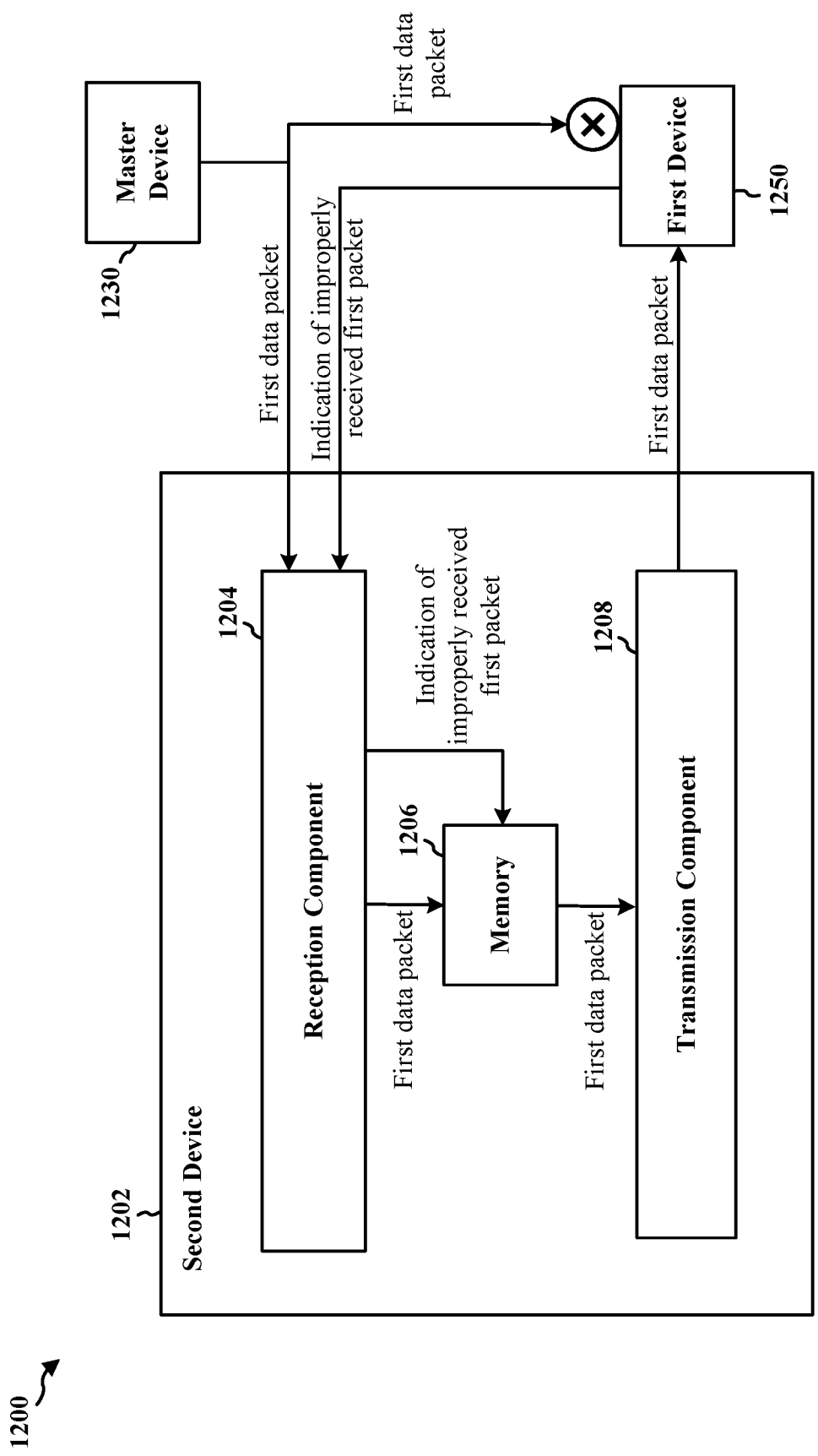
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus 1202 may be a wireless communication device (e.g., a slave device, a master device, etc.) or any other similar apparatus. The apparatus 1202 includes a reception component 1204 that receives a data packet, such as a first data packet, from a master device 1230. For example, as described in connection with 1102, the reception component 1204 may receive a first data packet from a master device (e.g., the master device 1230). The reception component 1204 may provide the first data packet to a memory 1206 that stores the first data packet therein.

The reception component 1204 may receive an indication from a first device 1250 that indicates the first device 1250 did not properly receive the first data packet from the master device 1230. For example, as described in connection with 1104, the reception component 1204 may receive information from a first slave device indicating that the first data packet from the master device 1230 was improperly received. Based on the indication, the first data packet may be retrieved from the memory 1206 and provided to a transmission component 1208 included in the apparatus 1202 that transmits the first data packet to the first device 1250. For example, as described in connection with 1106, the transmission component 1208 may transmit, based on the received information, the first data packet to the first slave device. As further described in connection with 1108, the transmission component 1208 may send an output signal associated with the first data packet for rendering at a speaker associated with the first slave device.

The apparatus 1202 may include additional components that perform each of the blocks of the algorithm in the aforementioned flowchart of FIG. 11. As such, each block in the aforementioned flowchart of FIG. 11 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
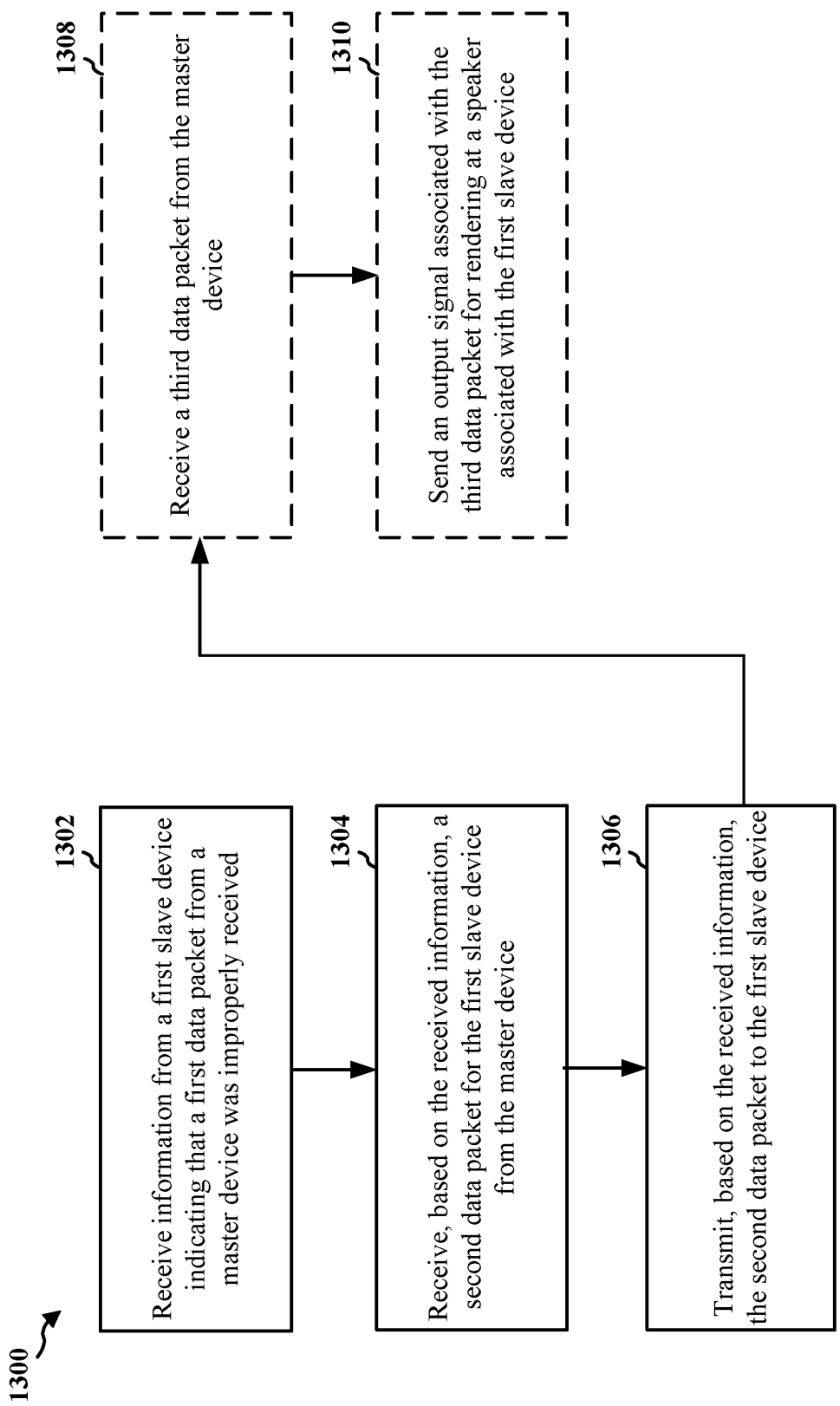
FIG. 13 is a flowchart of a method of wireless communication of a second slave device.

FIG. 13 is a flowchart 1300 of an example method of wireless communication of a second slave device in accordance with one or more techniques of this disclosure. The method illustrated in the flowchart 1300 may be performed by a wireless source device (e.g., a master device), a peripheral device (e.g., a slave device), or any other wireless communication device, as used in connection with the examples of FIGS. 1-8.

At 1302, the second slave device receives information from a first slave device indicating that a first data packet from a master device was improperly received. For example, referring to FIGS. 6 and 8, the second slave device 806 may receive a sync packet from the first slave device 804 in a sync subevent that indicates the BIS 1 data packet p0 was improperly received from the master device 802. The received information may further include a request for the second slave device 806 to listen for data packets from the master device for the first slave device 804 and to forward the data packets from the master device for the first slave device 804 to the first slave device (e.g., based on enabling the broadcast relay mode at 614).

At 1304, the second slave device receives, based on the received information, a second data packet for the first slave device from the master device. For example, referring to FIGS. 6-8, the second slave device 806 may receive, based on the request, a BIS 1 data packet p1 for the first slave device 804 from the master device 802 based on the broadcast relay mode being enabled at 614. The first data packet (e.g., data packet p0) and the second data packet (e.g., data packet p1) may be unicast data packets or the first data packet (e.g., data packet p0) and the second data packet (e.g., data packet p1) may be broadcast data packets.

At 1306, the second slave device transmits, based on the received information, the second data packet to the first slave device. For example, referring to FIGS. 6-8, the second slave device 806 may transmit to the first slave device 804, based on the request, the data packet p1 in a BIS1 relay subevent. Further, the second data packet (e.g., the data packet p1) may comprise a BLE audio data packet.

At 1308, the second slave device receives a third data packet from the master device. For example, the second slave device may receive another data packet, such as a data packet p2, from the master device 802. The third data packet and the second data packet may be associated with a same receive BIG event, but are associated with different BIS events of the BIG event. The different BIS events may include a first BIS event for the first slave device 804 and a second BIS event for the second slave device 806.

At 1310, the second slave device sends an output signal associated with the third data packet for rendering at a speaker associated with the first slave device. For example, referring to FIG. 8, the second slave device 806 may send a relay signal including the data packet p2 that causes a speaker associated with the first slave device 804 to render at the first slave device 804.

Figure 14:
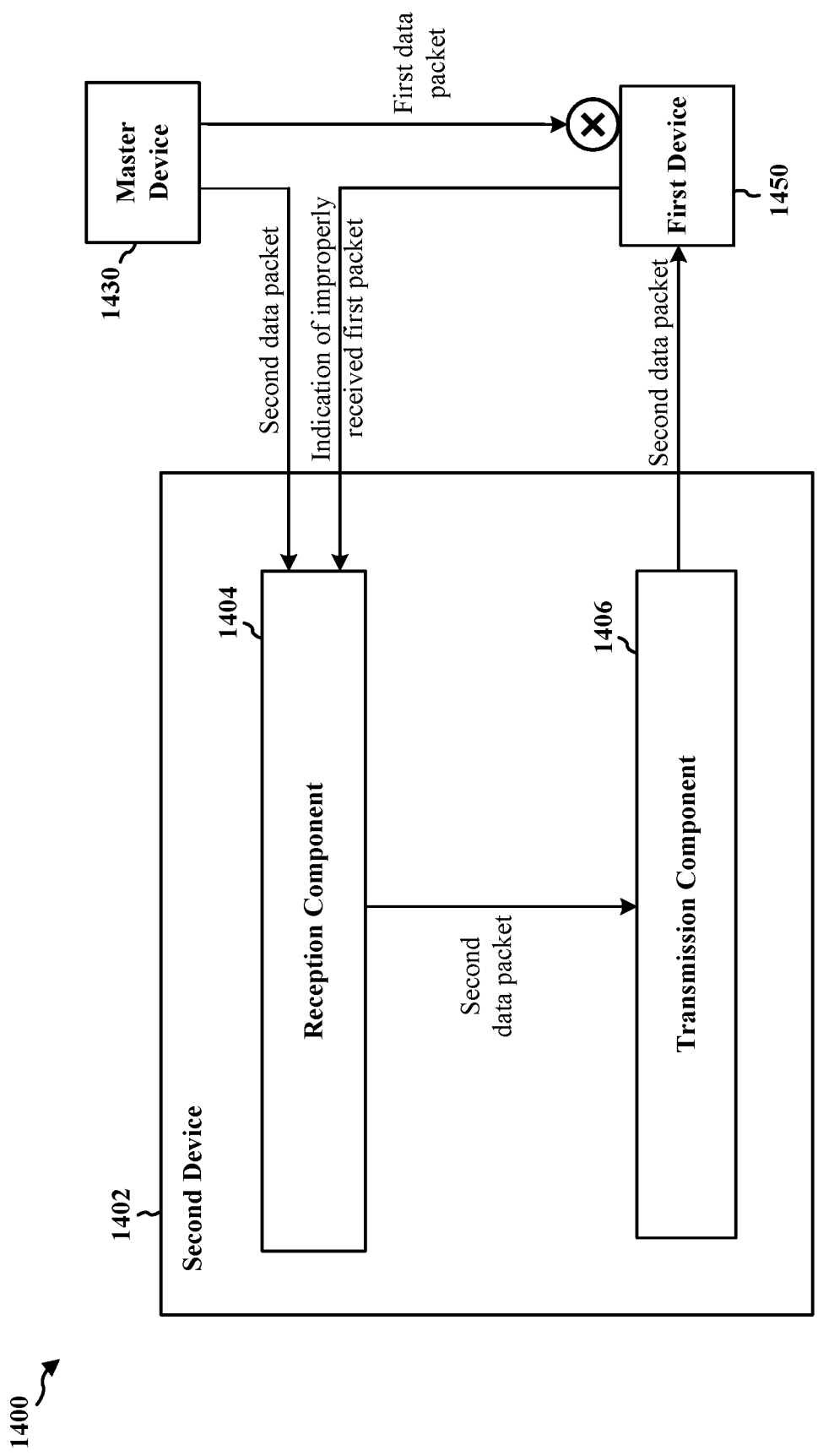
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus 1402 may be a wireless communication device (e.g., a slave device, a master device, etc.) or any other similar apparatus. The apparatus 1402 includes a reception component 1404 that receives an indication from a first device 1450 that indicates the first device 1450 did not properly receive a first data packet from a master device 1430. For example, as described in connection with 1302, the reception component 1404 may receive information from a first slave device indicating that a data packet from a master device (e.g., the master device 1430) was improperly received.

The reception component 1404 may receive a second data packet from the master device based on the indication received from the first device 1450. For example, as described in connection with 1304, the reception component 1404 may receive, based on the received information, a second data packet for the first slave device from the master device. Further, as described in connection with 1308, the reception component 1404 may receive a third data packet, and so on (e.g., n additional data packets), for the first slave device from the master device 130.

The apparatus 1402 includes a transmission component 1406 that transmits the second data packet to the first device 1450. For example, as described in connection with 1306, the transmission component 1406 may transmit, based on the received information, the second data packet to the first slave device. As further described in connection with 1310, the transmission component 1406 may send an output signal associated with the second, third, and/or nth data packet for rendering at a speaker associated with the first slave device.

The apparatus 1402 may include additional components that perform each of the blocks of the algorithm in the aforementioned flowchart of FIG. 13. As such, each block in the aforementioned flowchart of FIG. 13 may be performed by a component and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
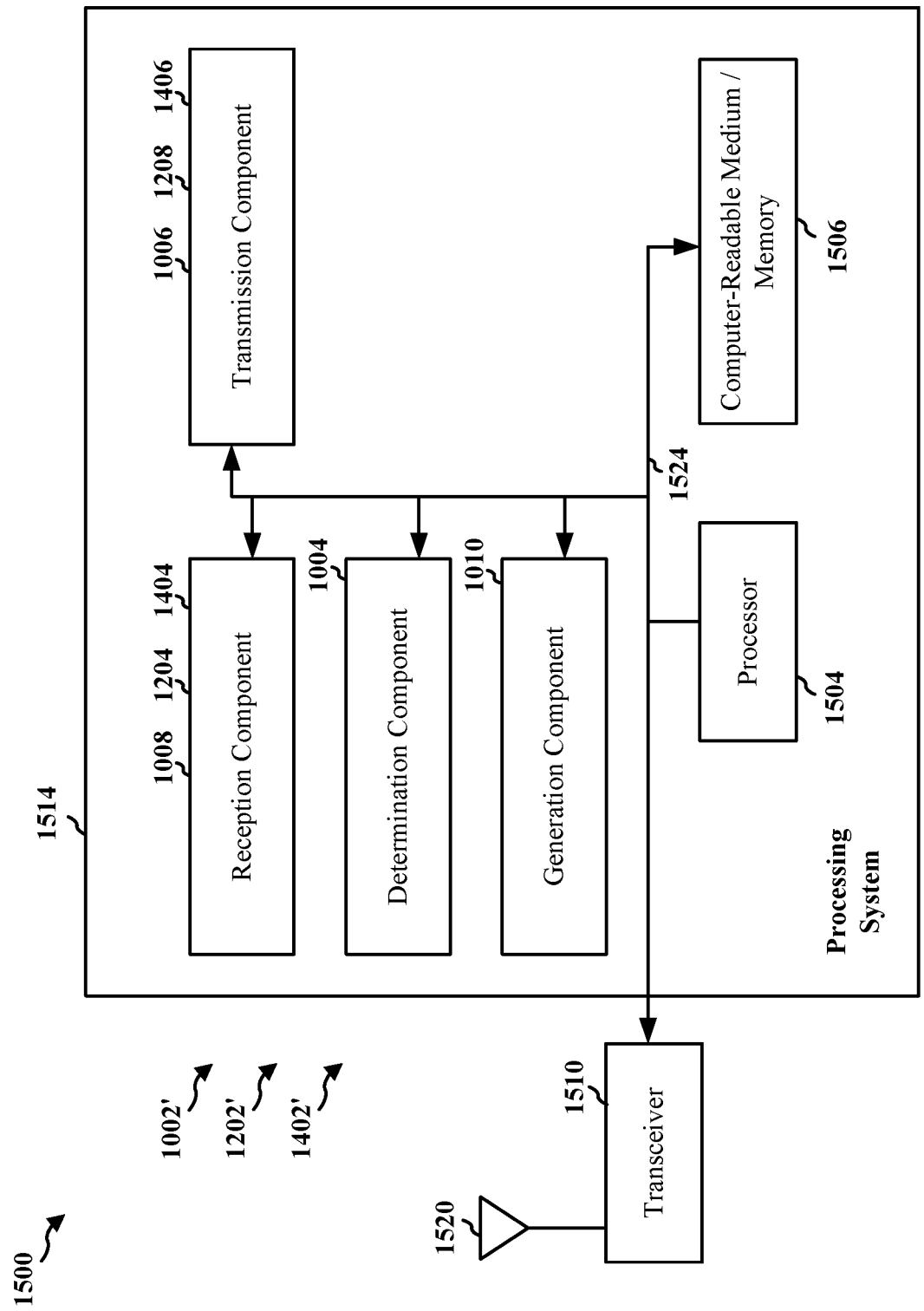
FIG. 15 is a diagram illustrating an example of a hardware implementation for an apparatus employing a processing system.

FIG. 15 is a diagram 1500 illustrating an example of a hardware implementation for an apparatus (1002', 1202', 1402') employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1004-1010, 1204, 1208, 1404-1406, and the computer-readable medium/memory 1506. It should be appreciated from the foregoing that the components 1008, 1204, 1404 are not necessarily a same reception component and the components 1006, 1208, 1406 are not necessarily a same transmission component. In some configurations the computer-readable medium/memory 1506 may be the memory 1206.

The bus 1524 may also link various other circuits such as timing sources, peripherals, voltage regulators, and power management circuits, which are well known in the art, and therefore, are not described further. The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1008, 1204, 1404. In addition, the transceiver 1510 receives information from the processing system 1514, specifically the transmission component 1006, 1208, 1406, and based on the received information, generates a signal to be applied to the one or more antennas 1520.

The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software.

The processing system 1514 further includes at least one of the components 1004-1010, 1204, 1208, 1404-1406. The components may be software components running in the processor 1504, resident/stored in the computer readable medium/memory 1506, one or more hardware components coupled to the processor 1504, or some combination thereof. In configurations, the apparatuses 1002/1002',1202/1202', 1402/1402' for wireless communication include means for receiving, determining, generating, sending, and transmitting. The aforementioned means may be one or more of the aforementioned components of the apparatuses 1002, 1202, 1402 and/or the processing system 1514 of the apparatuses 1002',1202',1402' configured to perform the functions recited by the aforementioned means.

Accordingly, a first slave device may determine that a first data packet was improperly received from a master device and, as a result, transmit information to a second slave device indicating that the first data packet was improperly received, so that a corresponding data packet to the improperly received/missed data packet may be relayed from the second slave device to the first slave device. For jointly coded data, the second slave device may receive from the master device a first data packet included in a joint data stream of the slave devices, where the first data packet may be stored in memory of the second slave device. Subsequently, the second slave device may receive an indication from the first slave device that the first data packet was improperly received from the master device and, in response thereto, retrieve the first data packet from memory and relay the first data packet to the first slave device. For split coded/non-jointly coded data, the second slave device may receive an indication that the first slave device improperly received a first data packet. Based on the indication, the second slave device may begin listening for the data stream of the first slave device in addition to its own data stream, so that when a second data packet for the first slave device is received by the second slave device from the master device, the second slave device may relay the second data packet to the first slave device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first slave device, comprising:
   determining that a first data packet is improperly received from a master device;
   transmitting, upon determining that the first data packet was improperly received, information to a second slave device indicating the first data packet was improperly received, wherein the transmitted information comprises a request for the second slave device to listen for data packets from the master device for the first slave device and, upon receiving the data packets from the master device for the first slave device, at least one of forward the data packets from the master device for the first slave device to the first slave device or store the data packets at the second slave device; and receiving, based on the transmitted information, a second data packet from the second slave device.

2. The method of claim 1, wherein the transmitted information comprises an identifier of the first data packet, the first data packet and the second data packet being at least one of a same data packet or associated with a same content.

3. The method of claim 1, further comprising receiving properly or improperly the second data packet from the second slave device, the second data packet being subsequent to the first data packet.

4. The method of claim 1, wherein the first data packet is a unicast data packet that is improperly received from the master device over a synchronous connection-oriented (SCO) link.

5. The method of claim 1, wherein the first data packet is a broadcast data packet from the master device.

6. The method of claim 5, wherein the determining that the first data packet is improperly received comprises determining, during a receive event of the first data packet, that the first data packet is improperly received in each of n receive subevents from the master device.

7. The method of claim 6, wherein the receive event is a broadcast isochronous group (BIG) event, and the receive subevents are broadcast isochronous stream (BIS) subevents.

8. The method of claim 1, further comprising generating a signal associated with the second data packet for rendering at a speaker associated with the first slave device.

9. The method of claim 1, wherein the first data packet and the second data packet each comprise a Bluetooth low energy (LE) audio data packet.

10. An apparatus for wireless communication, the apparatus being a first slave device, comprising:

means for determining that a first data packet is improperly received from a master device;

means for transmitting, upon determining that the first data packet was improperly received, information to a second slave device indicating the first data packet was improperly received, wherein the transmitted information comprises a request for the second slave device to listen for data packets from the master device for the first slave device and, upon receiving the data packets from the master device for the first slave device, at least one of forward the data packets from the master device for the first slave device to the first slave device or store the data packets at the second slave device; and means for receiving, based on the transmitted information, a second data packet from the second slave device.

11. The apparatus of claim 10, wherein the transmitted information comprises an identifier of the first data packet, the first data packet and the second data packet being at least one of a same data packet or associated with a same content.

12. The apparatus of claim 10, further comprising means for receiving properly or improperly the second data packet from the second slave device, the second data packet being subsequent to the first data packet.

13. The apparatus of claim 10, wherein the first data packet is a unicast data packet that is improperly received from the master device over a synchronous connection-oriented (SCO) link.

14. The apparatus of claim 10, wherein the first data packet is a broadcast data packet from the master device.

15. The apparatus of claim 14, wherein the means for determining that the first data packet is improperly received is configured to determine, during a receive event of the first data packet, that the first data packet is improperly received in each of n receive subevents from the master device.

16. The apparatus of claim 15, wherein the receive event is a broadcast isochronous group (BIG) event, and the receive subevents are broadcast isochronous stream (BIS) subevents.

17. The apparatus of claim 10, further comprising means for generating a signal associated with the second data packet to render at a speaker associated with the first slave device.

18. The apparatus of claim 10, wherein the first data packet and the second data packet each comprise a Bluetooth low energy (LE) audio data packet.

19. An apparatus for wireless communication, the apparatus being a first slave device, comprising:

a memory; and at least one processor coupled to the memory and configured to:

determine that a first data packet is improperly received from a master device;

transmit, upon determining that the first data packet was improperly received, information to a second slave device indicating the first data packet was improperly received, wherein the transmitted information comprises a request for the second slave device to listen for data packets from the master device for the first slave device and, upon receiving the data packets from the master device for the first slave device, at least one of forward the data packets from the master device for the first slave device to the first slave device or store the data packets at the second slave device; and receive, based on the transmitted information, a second data packet from the second slave device.

20. The apparatus of claim 19, wherein the transmitted information comprises an identifier of the first data packet, the first data packet and the second data packet being at least one of a same data packet or associated with a same content.

21. The apparatus of claim 19, wherein the at least one processor is further configured to receive properly or improperly the second data packet from the second slave device, the second data packet being subsequent to the first data packet.

22. The apparatus of claim 19, wherein the first data packet is a unicast data packet that is improperly received from the master device over a synchronous connection-oriented (SCO) link.

23. The apparatus of claim 19, wherein the first data packet is a broadcast data packet from the master device.

24. The apparatus of claim 23, wherein for the determination that the first data packet is improperly received, the at least one processor is further configured to determine, during a receive event of the first data packet, that the first data packet is improperly received in each of n receive subevents from the master device.

25. The apparatus of claim 24, wherein the receive event is a broadcast isochronous group (BIG) event, and the receive subevents are broadcast isochronous stream (BIS) subevents.

26. The apparatus of claim 19, wherein the at least one processor is further configured to generate a signal associated with the second data packet for rendering at a speaker associated with the first slave device.

27. The apparatus of claim 19, wherein the first data packet and the second data packet each comprise a Bluetooth low energy (LE) audio data packet.

28. A non-transitory computer-readable medium storing computer executable code, the code when executed by a processor of a first slave device, causes the processor to:
- determine that a first data packet is improperly received from a master device;
- transmit, upon determining that the first data packet was improperly received, information to a second slave device indicating the first data packet was improperly received, wherein the transmitted information comprises a request for the second slave device to listen for data packets from the master device for the first slave device and, upon receiving the data packets from the master device for the first slave device, at least one of forward the data packets from the master device for the first slave device to the first slave device or store the data packets at the second slave device; and
- receive, based on the transmitted information, a second data packet from the second slave device.

* * * * *